United States Patent [19]

Galdun et al.

[11] Patent Number: 4,521,871

[45] Date of Patent: Jun. 4, 1985

[54] PROGRAMMABLE CONTROLLER WITH BACK-UP CAPABILITY

[75] Inventors: Daniel J. Galdun, Huntsburg, Ohio; Raymond A. Grudowski, Round Rock, Tex.; Mark A. Flood, Richmond Heights, Ohio

[73] Assignee: Allen-Bradley Company, Milwaukee, Wis.

[21] Appl. No.: 367,594

[22] Filed: Apr. 12, 1982

[51] Int. Cl.³ .............................................. G06F 15/46
[52] U.S. Cl. .................................... 364/900; 364/187
[58] Field of Search ... 364/200 MS File, 900 MS File, 364/184, 187; 371/8, 9

[56] References Cited

U.S. PATENT DOCUMENTS

| 4,053,747 | 10/1977 | Davis | 364/187 X |
| 4,122,519 | 10/1978 | Bielawski et al. | 364/900 |
| 4,276,593 | 6/1981 | Hansen | 367/187 X |
| 4,351,023 | 9/1982 | Richer | 364/187 |

Primary Examiner—Thomas M. Heckler
Attorney, Agent, or Firm—Barry E. Sammons

[57] ABSTRACT

An active programmable controller services I/O racks which contain circuits that interface with sensing devices and operating devices on a machine being controlled. A back-up programmable controller monitors this I/O data to maintain a current I/O image table in its memory. Other status data is coupled to the back-up controller from the active controller through a peer-to-peer communications link. If a malfunction occurs in the active controller, the back-up controller is signaled to switch to the active mode in which it assumes control of the operating devices on the machine being controlled.

6 Claims, 34 Drawing Figures

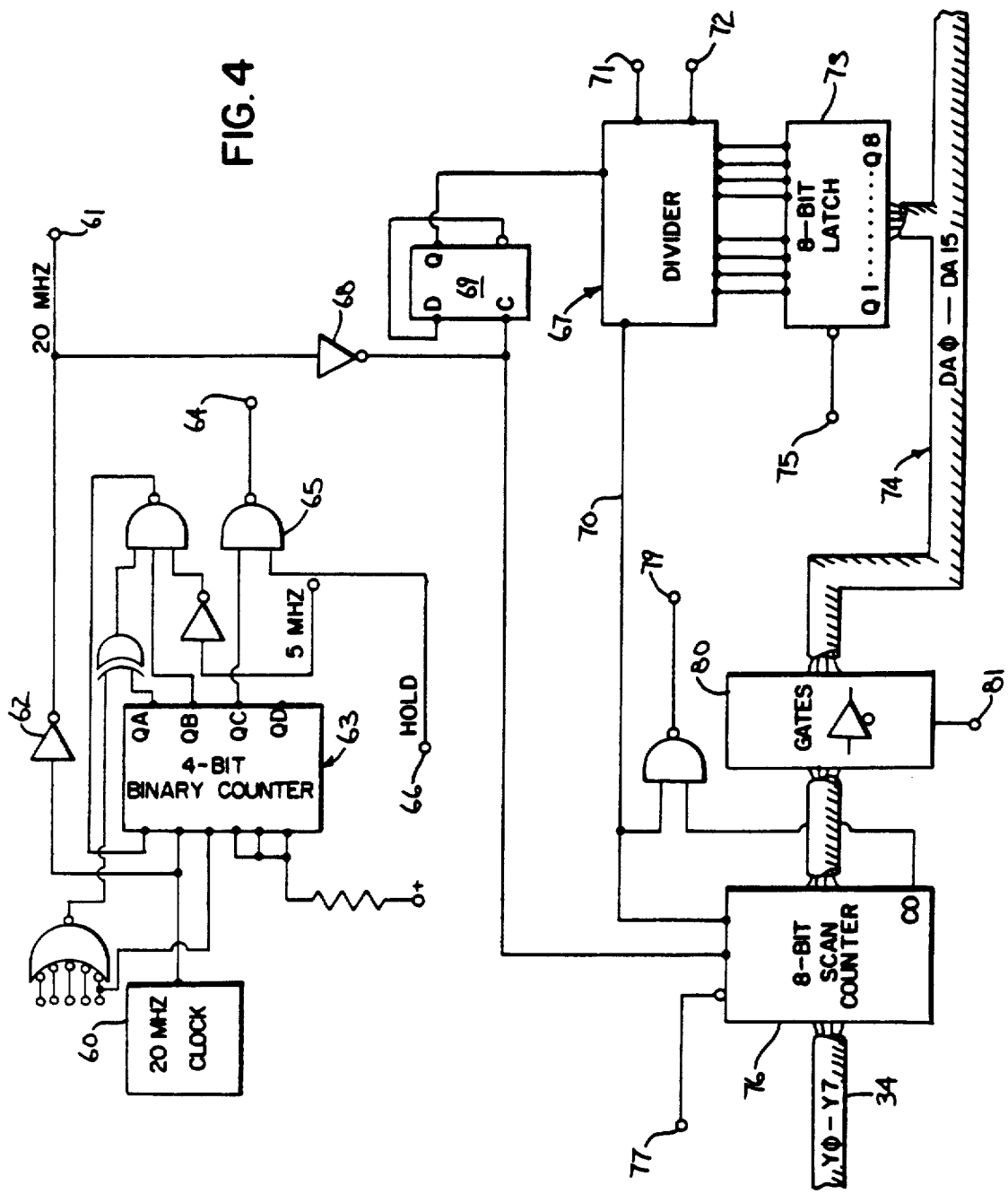

| FIELD DESCRIPTION | MICRO-SEQUENCER INSTRUCTION | SOURCE FOR JUMP | ALU INTERNAL SOURCE | ALU FUNCTION | ALU INTERNAL DESTINATION | ALU RAM "B" ADDRESS | SOURCE FOR ALU PORT 27 | ALU Y PORT 30 DESTINATION | SOURCE FOR ALU PORT 28 | READ/WRITE CONTROL | CARRY CONTROL |
|---|---|---|---|---|---|---|---|---|---|---|---|
| MICRO BIT NO. | 0 1 2 3 | 4 5 6 7 | 8 9 10 11 | 12 13 14 15 | 16 17 18 19 | 20 21 22 23 | 24 25 26 27 | 28 29 30 31 | 32 33 34 | 35 36 37 | 38 39 |
| 0 | JUMP 3 | PIPE | R=A, S=B |  | RAn | B REG. 0 | INSTR | NOP | NOP | NOP | ZER |
| 1 | CONT | ALU16 | R=A,S=DB | S-R-1+Cn | RLn | B REG. 1 | INSTR | ASDR | NOP | HOLD | ONE |
| 2 | LOOP | MACRO | R=A,S=Q | R-S-1+Cn | RAnQ | B REG. 2 | DATA | BACK L | NOP | BWH | ZFL |
| 3 | LOAD | NOP | R=A,S=Q̄ | R+S+Cn | RLnQ | B REG. 3 | RAM | FETH I | NOP | BRH | CAR |
| 4 | IMPOP | IVECT | R=DA,S=B | S+Cn | SnP | B REG. 4 | BFLOP | BACK H | IMM | WRITE | |
| 5 | RET | ALU | R=DA,S=DB | S̄+Cn | QR | B REG. 5 | BFLOP | FETCH | IMM | READ | |
| 6 | AGAIN | MAP | R=DA,S=Q | R+Cn | Q | B REG. 6 | TIME | DATA | MASK | BACK W | |
| 7 | BACK | VECT | R=DA,S=Q̄ | R̄+Cn | SnQ | B REG. 7 | TIME | BACK D | N MASK | BACK R | |
| 8 | JUMP 2 | | | LOW | L An | B REG. 8 | FLAGS | NOP | | | |
| 9 | VECT | | | R AND S | L Ln | B REG. 9 | FLAGS | NOP | | | |
| A | CALL 2 | | | R XNOR S | L An Q | B REG. 10 | NOP | IRES | | | |
| B | PUSH | | | R XOR S | L Ln Q | B REG. 11 | NOP | SYST | | | |
| C | JUMP | | | R AND S̄ | N | B REG. 12 | NOP | TIME | | | |
| D | MAP | | | R NOR S | QL | B REG. 13 | NOP | NOP | | | |
| E | CALL | | | R NAND S | X | B REG. 14 | NOP | I MASK | | | |
| F | RESET | | | R OR S | Sn | B REG. 15 | NOP | I LOAD | | | |
| HEXADECIMAL VALUE OF MICROFIELD | EXTERNAL ACCESS ENABLE | | (MACRO FLAG LATCH ENABLE) | | | | OR ALU RAM "A" REGISTERS | | | | |

| FIELD DESCRIPTION | | CONDITION | IMMEDIATE DATA |
|---|---|---|---|
| | | | TARGET ADDRESS |
| | | 40 41 42 43 | 44 45 46 47 48 49 50 51 52 53 54 55 |
| MICRO BIT NO | 0 | TRUE | |
| | 1 | FALSE | |
| | 2 | INTER | |
| | 3 | NOP | |
| | 4 | NOP | |
| | 5 | NOP | |
| | 6 | NOP | |
| | 7 | NOP | |
| | 8 | CARRY | |
| | 9 | N CARR | |
| | A | OVER | |
| | B | N OVER | |
| | C | MINUS | |
| | D | PLUS | |
| | E | ZERO | |
| | F | N ZERO | |
| HEXADECIMAL VALUE OF MICROFIELD | | | |

| | ID WORD | | |
|---|---|---|---|
| | REMOTE ACCESS REQUEST COUNTER | | OUTPUTS RESET REQUEST COUNTER |
| F1 | FREEZE COUNTER | F2 | SYNCHRONOUS FREEZE COUNTER |
| | ON-LINE EDITING DATA | | |
| | REMOTE DEVELOPEMENT DATA | | |
| | MINOR FAULT FLAGS | | |
| | SYSTEM MAJOR FAULT FLAGS | | |
| | USER MAJOR FAULT FLAGS | | |
| | SYSTEM MODE DATA | | |
| I/O PRESCAN COUNTER | | DESIRED CONTEXT | ACTUAL CONTEXT |
| | | | |
| | CPU COMMAND DATA | | |
| CPU WATCHDOG SET POINT | | CPU WATCHDOG HIGH VALVE | |
| SYSTEM COUNTER | | CPU WATCHDOG PRESENT VALVE | |
| | YEAR | | |
| | MONTH | | |
| | DAY | | |
| | HOUR | | |
| | MINUTE | | |
| | SECOND | | |
| | REAL TIME CLOCK STATUS DATA | | |

FIG.13A

ACCESS CONTROL BLOCK

| X | S | A | B | C |
|---|---|---|---|---|
| P | | ACCESS COUNTER | MSB OF POINTER | |
| | | LSB OF POINTER | | |
| | | | MSB OF SIZE | |
| | | LSB OF DATA SECTION SIZE | | |

FIG.13B

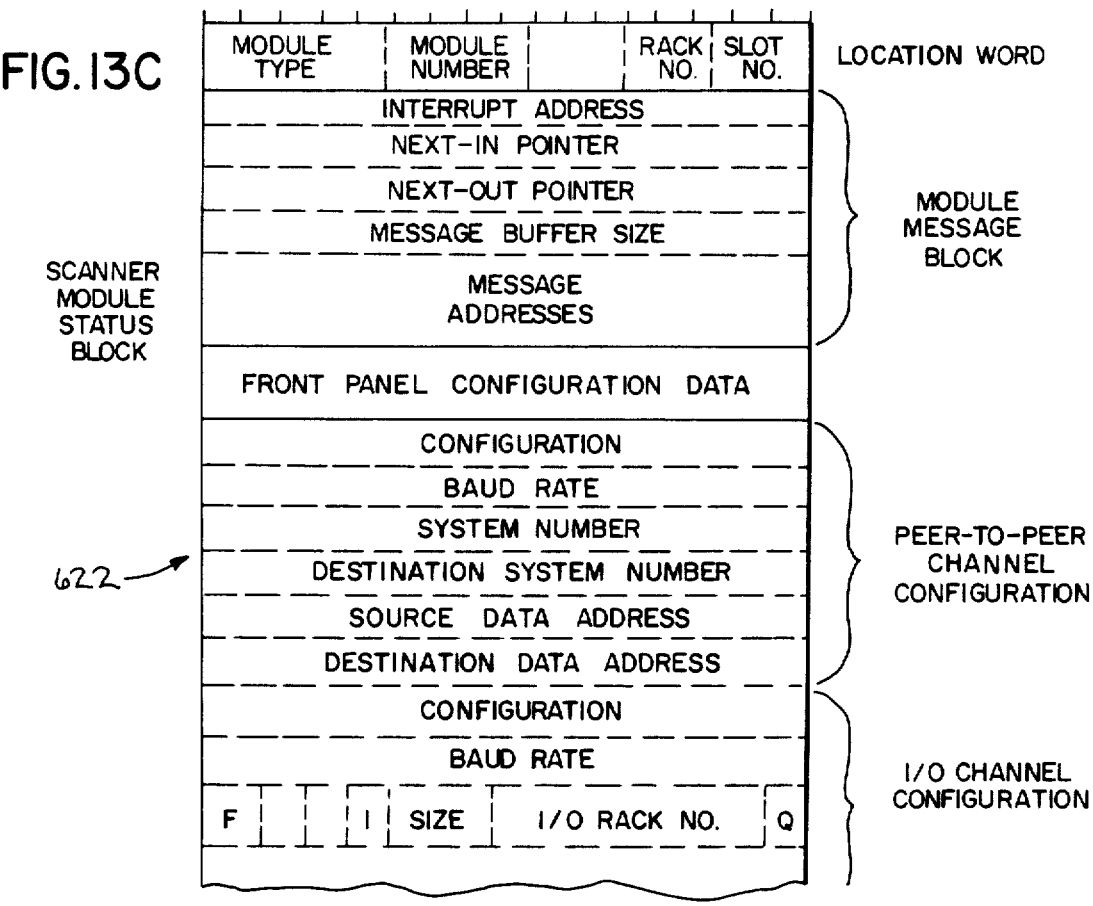

FIG.14A  RUNG CONTROL INSTRUCTIONS
FIG.14B  PROGRAM CONTROL INSTRUCTIONS
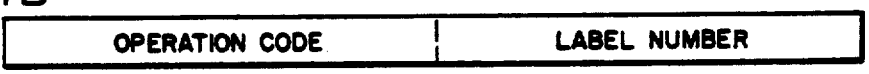
FIG.14C  TEST/CONTROL BIT INSTRUCTIONS
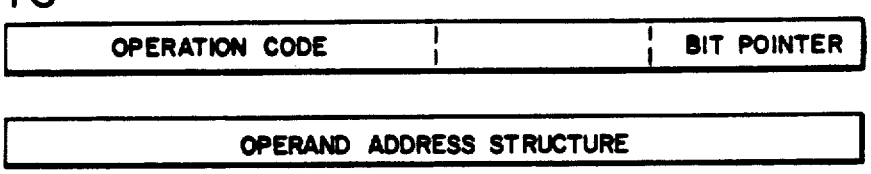
FIG.14D  TIMER/COUNTER INSTRUCTIONS
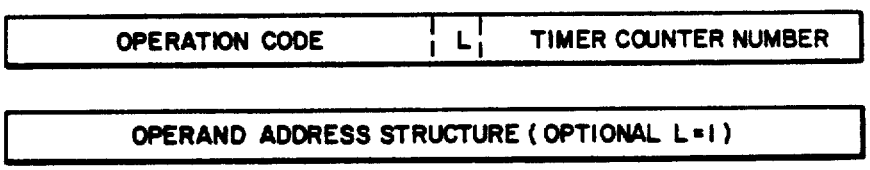
FIG.14E  ARITHMETIC/LOGIC INSTRUCTIONS
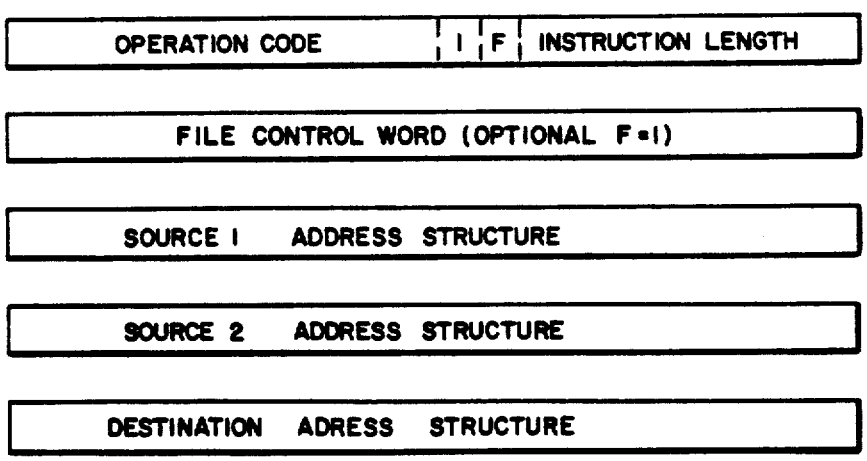

FIG.15    OPERAND ADDRESS STRUCTURE
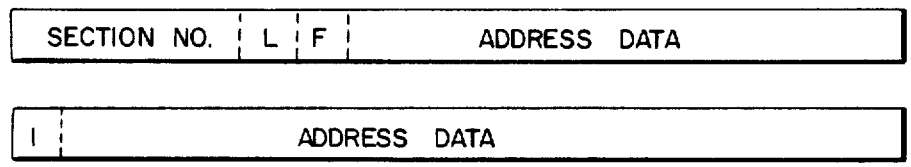
FIG.16    FILE CONTROL WORD STRUCTURES
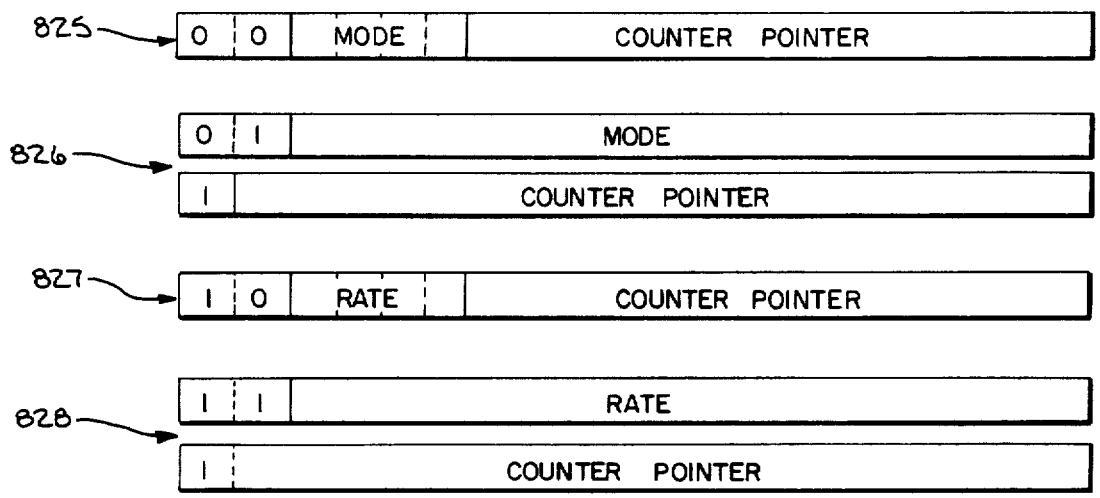
FIG.17    TIMER/COUNTER STRUCTURE
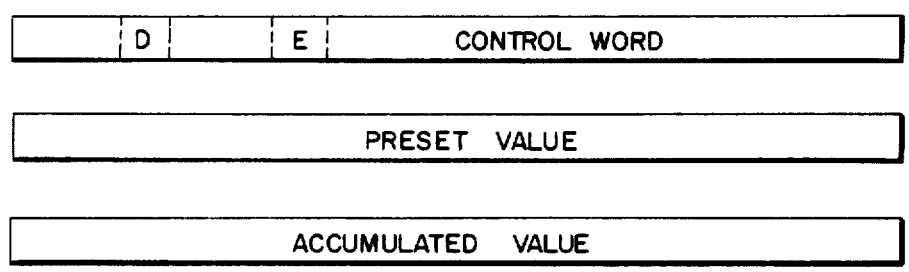

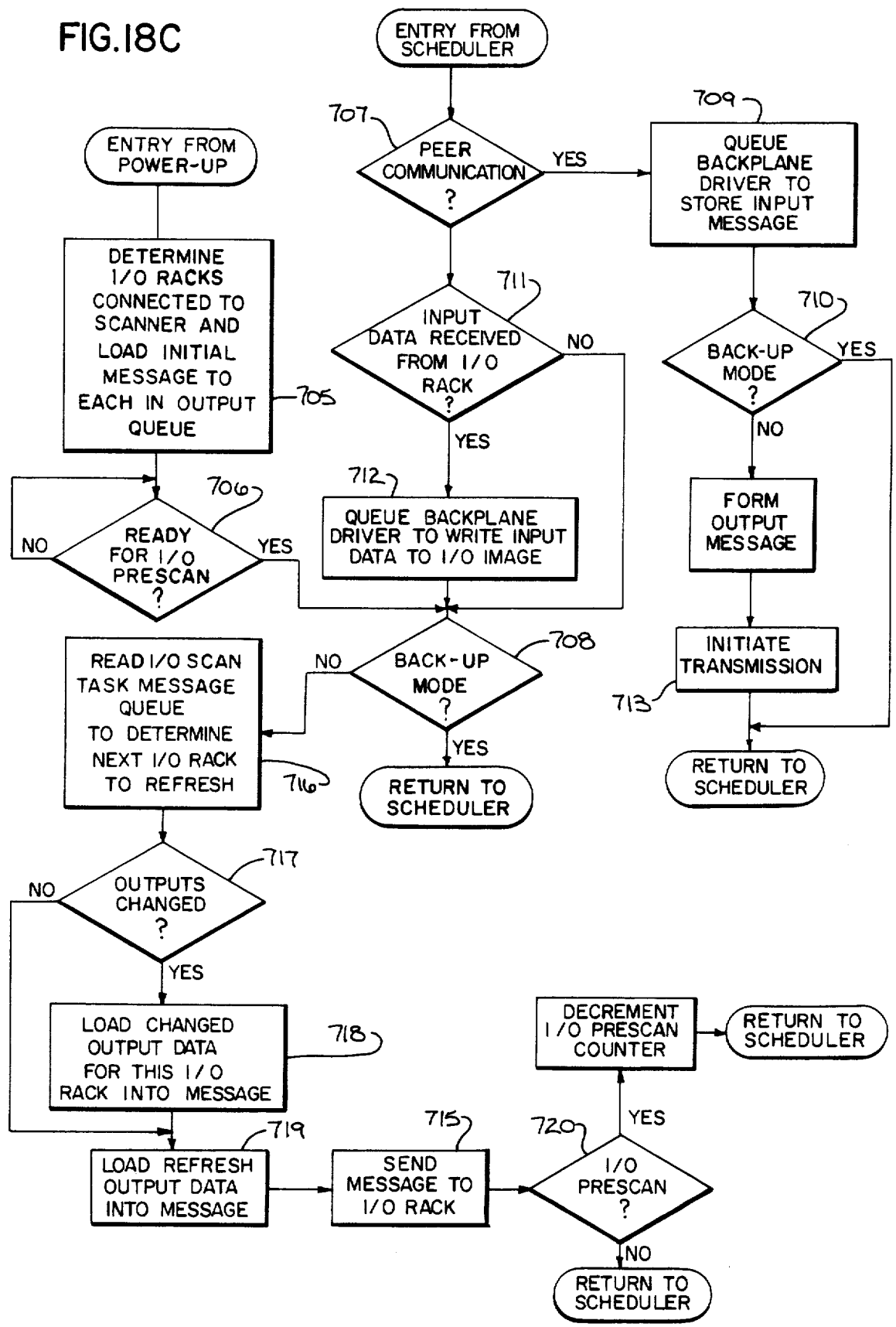

PROGRAMMABLE CONTROLLER WITH BACK-UP CAPABILITY

BACKGROUND OF THE INVENTION

The field of the invention is programmable controllers such as those described in U.S. Pat. Nos. 3,810,118; 3,942,158; and 4,165,534.

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices.

There are many applications for programmable controllers in which the "down time" resulting from malfunctions in the controller must be kept to an absolute minimum. For example, the cost of shutting down an automtive assembly line is enormous, and extraordinary measures are taken to insure that quality components are employed in their control systems. Despite such efforts, it is statistically certain that malfunctions, or failures, will occur in electrical and mechanical components. In control systems which employ relays and discrete logic circuits, individual components which malfunction can be easily and quickly replaced. Often such replacement can be accomplished without shutting down the entire system, since the discrete component performs a very specific function that affects a very limited portion of the system.

It is an inherent characteristic of programmable controllers that the decision making functions of the system are concentrated in certain subsystems and components. For example, a malfunction in the memory which stores the control program, or a malfunction in the processor which reads and executes the control program, is catastrophic in the sense that the entire system being controlled is affected. Malfunction detection techniques are employed to sense and quickly diagnose such problems, and the components are mounted on circuit boards which can be quickly replaced. However, even if the malfunction is quickly discovered, diagnosed and fixed, the resetting and power-up of the system requires considerable effort and time.

The use of redundant components, or modules, is common practice in a number of fields. In the aerospace field, for example, there is multiple redundancy of the entire flight control system and in the data processing field it is common to provide redundant processors or input/output controllers. In the industrial control field redundancy of the entire system is economically impractical. On the other hand, the mere doubling of selected hardware modules is inadequate since the integrity of the data structures stored in memory is often destroyed by a hardware malfunction, and the correction or reconstruction of such data structures requires considerable time.

SUMMARY OF THE INVENTION

The present invention relates to a back-up system for a programmable controller, and particularly to the inteconnection of the redundant hardware elements and the means for providing redundant data structures which enable the back-up system to rapidly assume control when a malfunction occurs in the primary system. Both the primary and back-up system include a memory for storing a control program and a data table and a processor for executing the control program. Both systems are connected to common I/O racks which interface to sensing devices and operating devices on the system being controlled. The processor on the primary system is operable to execute its control program to input status data from the I/O racks and to output data to the I/O racks. The data table in the primary system memory is periodically output to the back-up memory and when a malfunction occurs which shuts down the primary system, the back-up processor begins execution of its control program to input and output data to the same I/O racks using the latest copy of the data table.

A general object of the invention is to provide back-up for those portions of a programmable controller which affect the entire system being controlled. The I/O racks may comprise the majority of the hardware in a large programmable controller, but a malfunction in a single input or output circuit in an I/O rack may have very limited impact on the operation of the entire system. On the other hand, a malfunction in the processor or the memory of the programmable controller, as well as the circuitry and bus structure which couple them to the I/O racks, will in most instances affect the entire system and require an immediate power down. The present invention provides redundancy of these crucial elements without costly duplication of the I/O rack hardware.

Another object of the invention is to provide a rapid transfer of control from the primary system to the back-up system when a malfunction occurs. This is accomplished by a data link between the two systems which is operable when the primary system is functioning to periodically transfer data structures, including the data table, from the primary system memory to the back-up system memory. Thus, when the back-up system assumes control, it contains a relatively current data structure with which to operate. A lengthy power-up process is thus avoided.

Yet another object of the invention is to enable two programmable controllers to communicate with each other without the addition of expensive hardware. During power-up the user may configure one of the serial ports on the I/O scanner module of each programmable controller for peer-to-peer communications. An input file and an output file is formed in the memory module of each controller and the user may receive data from the other controller through the input file and transmit data to the other controller through the output file.

The foregoing and other objects and advantages of the present invention will become apparent from the following description of the preferred embodiment. Such embodiment does not necessarily represent the full scope of the invention, however, and reference is made to the claims for interpreting the breadth of the invention.

BRIEF DESCRIPTION OF THE DRAWINGS

FIG. 4 is an electrical schematic diagram of the time base and watchdog timer which forms part of the circuit of FIG. 2;

FIGS. 5A and 5B are a chart of the CPU module microfields;

FIGS. 13A-13D are schematic representations of data structures which form a part of the memory modules in FIG. 1;

FIGS. 14A-14E and 15-17 are schematic representations of data structures which are employed to execute selected control program instructions;

FIGS. 18A, 18B, and 18C are charts illustrating the functions performed by the I/O scanner module of FIG. 1;

DESCRIPTION OF THE PREFERRED EMBODIMENT

Figure 1A:
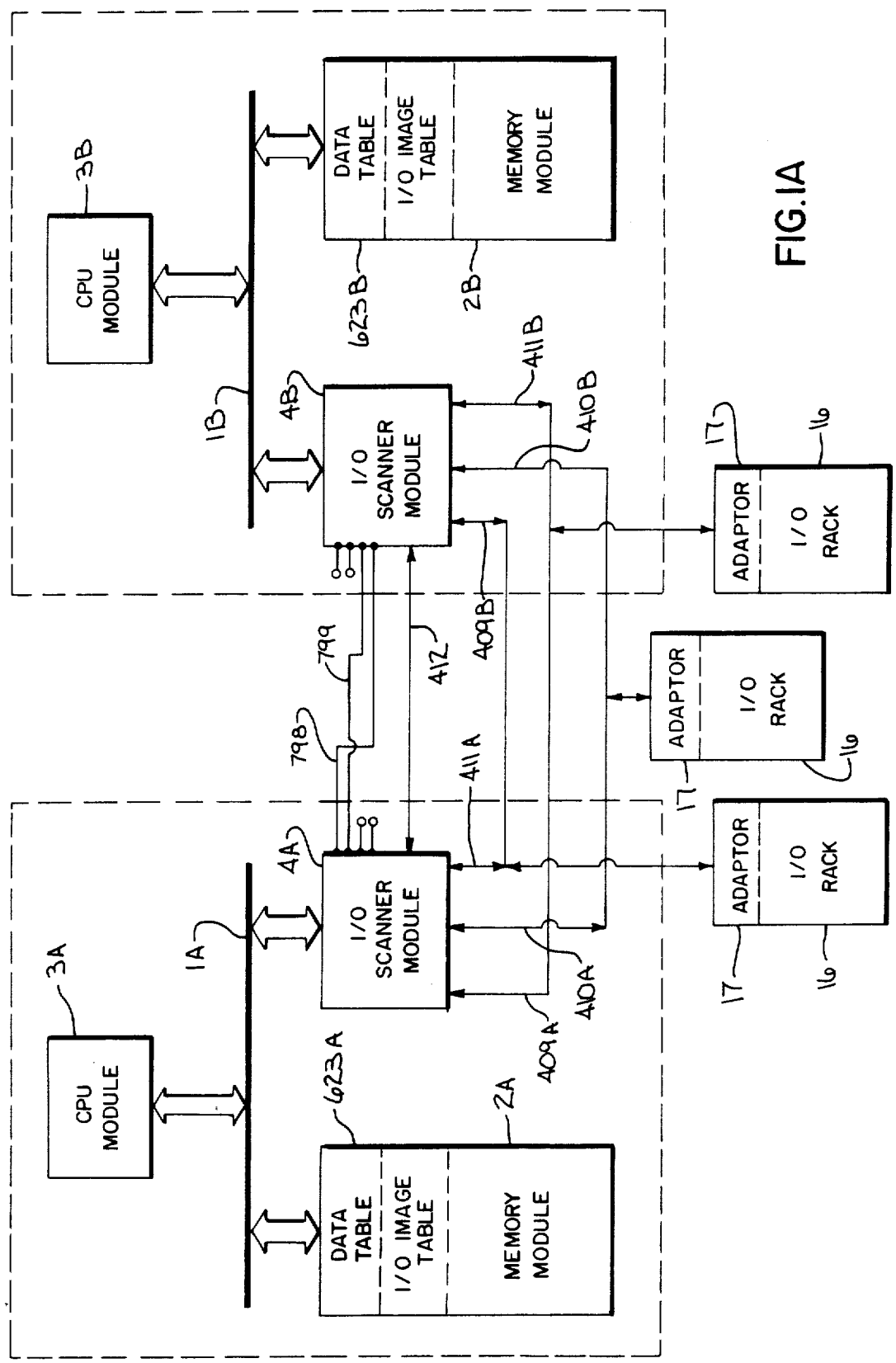
FIG. 1A is a block diagram of two programmable controllers which are interconnected to practice the present invention.
Figure 1B:
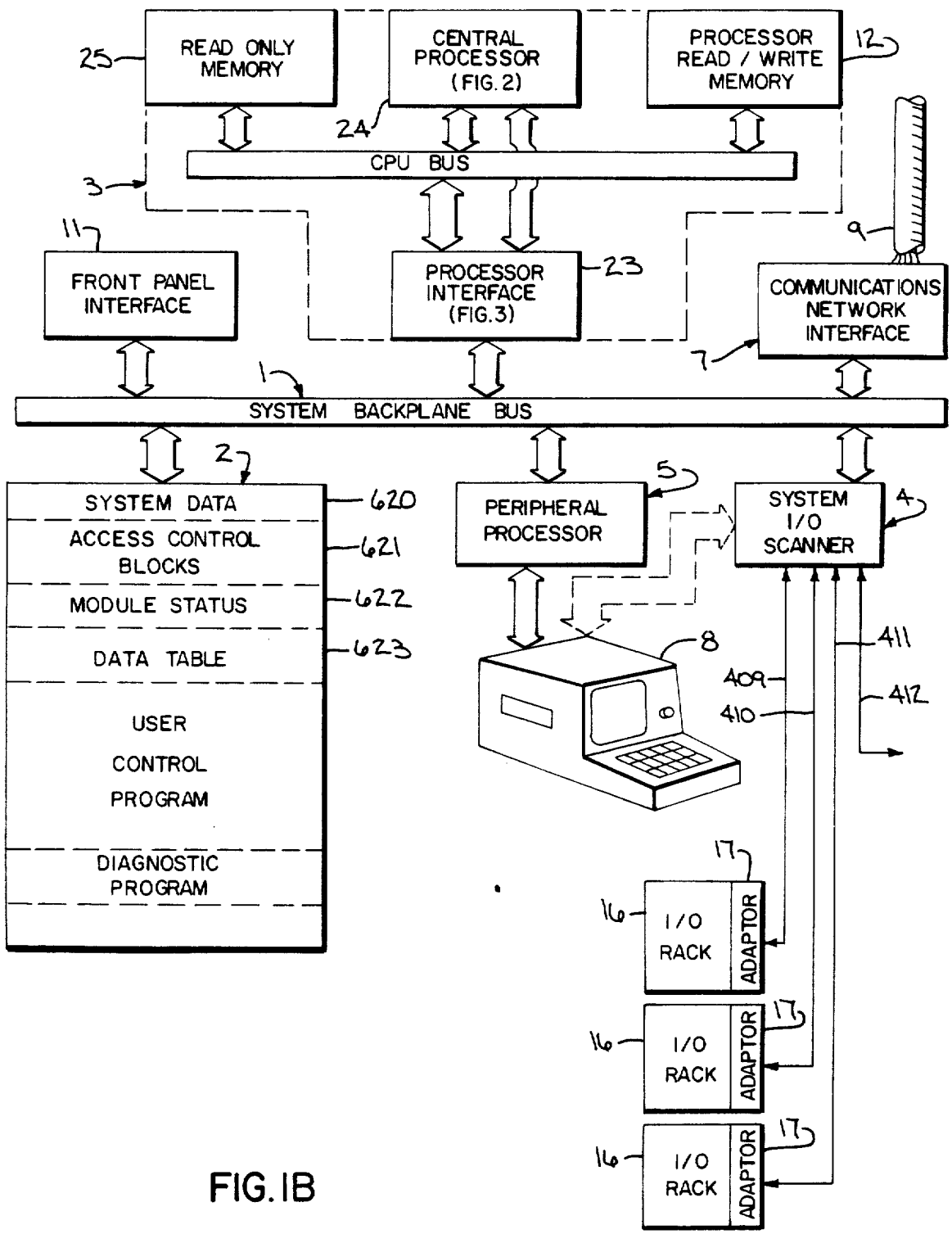
FIG. 1B is a block diagram of a programmable controller wich incorporates the present invention.

Referring to FIG. 1B, the programmable controller includes a number of functionally oriented modules which communicate with each other over a high-performance system backplane bus 1. The system backplane bus 1 includes 16 bidirectional data lines (D0-D15), 26 address lines (A1-A26), and a number of control lines which are employed to signal the transfer of data and to perform bus arbitration and other functions. All of the modules except a memory module 2 are potential masters of the system backplane bus 1 and each can control read and write functions on the bus 1. The backplane bus 1 is physically formed on a motherboard and the various system modules plug into edge connectors which attach to the bus leads and which form "slots" that mechanically support the module circuit boards.

There are a number of different functional modules which may be connected to the system backplane bus 1. These modules need not be present in every system, and indeed, one advantage of this architecture is that the programmable controller can be configured to a particular control function by selection of the proper type and number of modules. In addition, to the memory module 2, CPU module 3 and I/O scanner module 4, the programmable controller may also include a communications network interface module 7, a peripheral processor module 5, and a front panel 11. Most of the modules are allocated an address space of 256K and, with the exception of the CPU module 3, all modules may be duplicated in the system.

The memory module 2 contains from 4096 (4K) to 32,768 (32K) words of storage capacity. Each word contains 16-bits of data and one error detection bit. The module 2 occupies one slot in the system backplane bus 1, however, more than one memory module 2 may be used. The memory module 2 stores the user control program which is comprised of a set of macroinstructions that are executed to perform the desired control functions. The macroinstruction set includes conventional programmable controller instructions, arithmetic instructions and logic instructions, as well as many newly-defined instructions which employ the unique architecture of this programmable controller. The macroinstruction set is described in detail hereinafter in connection with the description of the CPU module 3.

The user control program is loaded into the memory module 2 and edited using a terminal 8 which is shown connected to the peripheral processor module 5, but which also may connect to the system I/O scanner module 4. The terminal 8 includes a keyboard having keys labeled with the proper instruction set mnemonics and a display which presents the control program in rung diagram format. A terminal such as that described in co-pending U.S. patent application, Ser. Nos. 75,175 and 75,176 filed on Sept. 12, 1979, is employed.

The communications network interface module 7 connects the programmable controller to a high speed data highway 9 which connects to other programmable controllers and computers in a network. Indeed, it may be a primary function of the programmable controller of the present invention to perform supervisory control operations in a distributed control system. The communications network interface 4 is microprocessor based and it functions to interface the network communication protocol with the system backplane bus protocol. For a detailed description of the communications network protocol and hardware interface, reference is made to co-pending U.S. patent application, Ser. No. 102,970, filed on Dec. 12, 1979 and entitled "Industrial Communications Network".

The peripheral processor 5 is a microcomputer system which provides interface capability with up to four peripheral devices through serial data links. In addition to the programming terminal 8, the peripheral processor may communicate with devices such as printers and teletypes, and with other computers, either directly or through modems. The perpheral processor 5 services each serial I/O port and communicates through the backplane bus 1 with other modules. For example, control program data entered from the terminal 8 is interpreted by the module 5 and written into the memory module 2. Or, if an editing function is input at the terminal 8, the peripheral processor 5 may perform a number of read and write cycles to shift portions of the control program in the memory module 2.

The system I/O scanner module 4 provides a high performance interface between the system backplane bus 1 and one or more I/O racks 16. Changes in the state of input points are received by the I/O scanner module 4 from the I/O racks 16, and this information is passed on to the data table 623 in the memory module 2 or the processor read/write memory 12. In addition, the I/O scanner module 4 outputs state change data to the I/O racks 16 which reflect state changes in I/O points.

The I/O modules in each rack 16 contain circuitry which connects the programmable controller to the machine being controlled. These include input circuits such as those disclosed in U.S. Pat. Nos. 3,643,115 and 4,275,307 which sense the opening and closing of switches. This circuitry also includes output circuits such as that disclosed in U.S. Pat. No. 3,745,546 which may be employed to control motors and solenoids. Although a vast majority of these modules are single-bit oriented, word oriented modules such as analog-to-digital and digital-to-analog converter modules disclosed in U.S. Pat. No. 4,104,731 may also be employed. Physically, the I/O racks 16 may take a number of forms as disclosed in U.S. Pat. Nos. 3,992,654; 4,151,580 and 4,152,750.

The front panel module 11 provides a convenient, but rather limited means for manually entering data into the system and for displaying data and diagnostic information. It is microprocessor-based and is operable to receive commands through a keyboard and process the commands to configure the system and control its mode of operation. The contents of selected lines of the I/O image and data table memory 12 can also be displayed and changed. The module 11 is mounted on the door of the processor housing and is connected to the system I/O scanner module 4 through the system backplane bus 1 and a ribbon cable.

Memory Module

As indicated above, one or more memory modules 2 may be connected to the system backplane bus 1 and any other module in the programmable controller may read or write to these memory modules. In addition to storing one or more control programs, the memory module 2 stores considerable data which relates to the status and operation of each module in the programmable controller system. These data structures serve to coordinate the operation of the various system modules.

Referring particularly to FIGS. 1 and 13A–13D, the memory module 2 includes a system data section 620, an access control block section 621, a module status section 622, and a data table section 623. The system data section 620 occupies twenty-one words of memory and is divided into fields that are dedicated to specific functions. The access control block section 621 is comprised of a set of data blocks, each associated with a particular system module or section of the memory module 2. Each such block of data occupies five lines of memory and is divided into fields which are dedicated to specific functions. The module status section 622 of the memory module 2 is comprised of blocks of data which each contain information concerning the status of specific system modules. And finally, the data table section 623 is comprised of sixteen sections, each of which is dedicated to store a specific type of data.

Referring to FIG. 13A, the system data section includes a number of fields which provide information concerning the status of the programmable controller system. These fields are defined as follows:

Remote Access Request Counter. This counter indicates the number of remote devices requesting control of the programmable controller.

Outputs Reset Request Counter. This counter indicates the number of tasks requesting that all output devices connected to the programmable controller be reset.

(F1) Freeze Counter. F1 is a bit which indicates that the CPU module has been commanded to stop execution of the control program, and the counter indicates the number of tasks making this request.

(F2) Synchronous Freeze Counter. F2 is a bit which indicates that the CPU module has been commanded to stop execution at the end of the next scan through the control program and the counter indicates the number of tasks making this request.

System Mode Data. This is a collection of status bits which indicate the mode of operation of the programmable controller, the memory protection mode and the programming mode.

I/O Prescan Counter. This is a four-bit counter used during initialization to indicate the number of I/O scanner modules yet to complete their I/O prescans.

CPU Timer and Counter Field. This field is comprised of four parts: a CPU watchdog timer set-point; a CPU scan time high value; a CPU scan timer present value; and a system counter 606. The CPU watchdog timer set-point defines the timeout period which generates a fault condition if the CPU does not periodically reset the watchdog timer. The high value is the longest scan time actually recorded and the present value is the accumulated time of the current scan. The scan time set-point is set by the CPU during its execution of the entire control program. This value is available to the user through the terminal 8. The system counter 606 has a number of uses. During the CPU pre-scan mode of operation this stores the number of pre-scans, and during the other CPU modes of operation this serves as a "heartbeat counter" which indicates to other modules in the system that the CPU module 3 is operating.

Real Time Clock. The remainder of the system data section 620 is occupied by a real time clock which is periodically updated by the CPU module 3. This clock has a range from years to 0.0001 seconds.

Referring particularly to FIGS. 1 and 13B, the access control block section 621 of the memory module 2 includes a five word block of data associated with each logical unit in the programmable controller. Each access control block includes a number of fields which are dedicated to performing the following functions.

(X) Configure Command Bit. When this bit is set it indicates that this logical unit should be initialized and included in the system configuration prior to running the programmable controller.

(S) Status Bit. When set this bit indicates that the logical unit is ready to run.

(A) Memory Section Number. This six-bit number indicates the memory module section number to which the logical unit relates. These are as follows:

0 = System data section
1 = Access control block section
2 = Module status section
3 = Data table section
4 = Control program section
5 = Messages section
6 = System symbols
7 = User symbols
63 = End of memory (B) Subsection Number. This four-bit number is a further definition of the logical unit. If the logical unit is a module, this number defines the type of module as follows:

1 = Memory module
2 = CPU module
3 = I/O Scanner module

4=Peripheral processor module
5=Communications network module

On the other hand, if the logical unit is a data structure, this number indicates one of a plurality of such data structures, or in other words, the context of the data structure.

(C) Subsection Number. This four-bit number is yet a further definition of the logical unit. If the logical unit is a module, it indicates one out of a plurality of similar modules. If the logical unit is a section of memory it defines a subsection of that data structure. Referring particularly to FIG. 13D for example, this number identifies a subsection of the data table portion of the memory as follows:

1 = Output image table
2 = Input image table
3 = Timer structures
4 = Counter structures
5 = Binary integers
6 = Floating point numbers
7 = BCD integers
8 = Binary data
9 = ASCII characters
10 = Gray code data
11 = Twelve-bit I/O data (P) Write protect bit. When set, data is not to be written to the logical unit.

Access Counter. This indicates the number of processes which are currently accessing the logical unit.

Pointer. This is an address pointer to the start of the logical unit. If the logical unit is a data structure it points to its memory address and if the logical unit is a module, it points to the memory address for the module's status area.

The remaining two lines of the access control block 621 define the size of the logical unit when it is a data structure stored in the memory module 2. This information is needed to perform certain editing functions.

Referring particularly to FIGS. 1 and 13C, each module in the system includes a corresponding block of data in the module status section 622 of the memory 2. Although much of the data in these module status blocks 622 is unique to each type of module, they do contain some common data structures. Such structures include a location word that identifies the module type, the module number, and its physical location on the system backplane. In addition, those modules which support processor-to-processor communications include a "module message block" data structure. As will be described in more detail hereinafter, the message data block includes an interrupt address for that module, as well as a buffer containing the backplane address of each message for the module. A pair of pointers indicate the next message address into and out of this buffer and a third word indicates the buffer's size.

When a module supports the front panel 11, its module status block 622 also includes a front panel data structure. In the preferred embodiment described herein the front panel is supported by the I/O scanner module 4 and thus this data structure appears in its module status block 622 as shown in FIG. 13C. This data includes both physical and operating configuration data for the front panel serial port, as well as data regarding the control privileges allowed the front panel 11.

Referring still to FIG. 13C, the module status block 622 for the I/O scanner module 4 includes data structures corresponding to each of the four serial I/O channels. Each of these data structures includes a "configuration" word which indicates if the I/O channel is active, and if so, what purpose it is serving. Another word indicates the baud rate at which communications is occurring as well as further data which is peculiar to the particular purpose it is serving. In the preferred embodiment three of the I/O channels are connected to an I/O rack 16, and this further data is a single word which indicates the size, nature and address space of the I/O rack 16. The fourth serial I/O channel is used for peer-to-peer communications. In addition to the configuration word and baud rate word, this portion of the module status block 622 stores the "system number" of the current controller and the system number assigned to the controller with which it communicates. This is followed by two "source data address" words which identify the section number in the data table 623 and the file number which stores data to be sent to the other programmable controller. Two "destination data address" words identify the section number and file number which is to store message data received from the other programmable controller.

In summary, the module status blocks 622 store data which is available to all modules on the backplane bus 1 and which indicates the number and type of modules in the system and the basic functions they are performing. For example, by examining the module status blocks 622 the CPU module 3 can determine which module and channel on that module is supporting the terminal 8 and the front panel interface 11.

Referring particularly to FIGS. 1 and 13D, the data table 623 in the memory module 2 is divided into fifteen sections, each of which stores a specific data type. Section 2 stores input data which is received through the system I/O scanner module 4. This data is written into the memory module 2 by the module 4 as it is received from the I/O racks 16. It is, therefore, an "image" of the state of the sensing devices which connect to the machine being controlled. Similarly, Section 1 of the data table 623 stores output data which is an image of the state of the operating devices on the machine being controlled.

The form of the data in the input and output image tables is the same as that of the particular input or output device to which it relates. A position encoder which serves as an input device to the system may, for example, generate a digital number using a "grey" code, where as a bar code reader may generate input data as a series of ASCII characters. Such data is input automatically to the input image table by the programmable controller and the control program may contain a MOVE instruction to transfer this data to the appropriate data type section of the data table 623. Such a transfer of data using the MOVE instruction does not perform a data conversion. However, when the MOVE instruction is used to transfer data of one type to a data table section of another type, a data conversion is made which is completely transparent to the user. Thus for example, a transfer of data using the MOVE instruction from the "binary data" section to the "BCD integer" section will make the appropriate data conversion. In addition, when data is read from a particular data type section of the data table 623 by the CPU module 3, it is automatically converted to a "native" data type which is consistent with the function being performed by the CPU module 3. Conversely, when data is written back to the data table 623 by the CPU module 3, the data is automatically converted from the native data type back to the indicated form.

When a serial I/O channel on the I/O scanner module 4 is configured for peer-to-peer communications, the data flowing through that channel is coupled to and from the files identified in the I/O scanner module's status block 622. For example, a source file may be identified in the "binary data" section of the data table 623 and a destination file may be identified in the same section. The user, through his control program, is responsible for transferring data which is to be sent to the other controller to this designated source file. Likewise, the user control program is responsible for transferring data from the identified destination file to other portions of the data table 623. As will be described in more detail below, the I/O scanner module 4 operates automatically to periodically output the indicated source file through the serial I/O channel 412, and it updates the contents of the indicated destination file with any message data received through the serial I/O channel 412. A general purpose peer-to-peer communications link is thus established between two programmable controllers.

CPU Module

Figure 2:
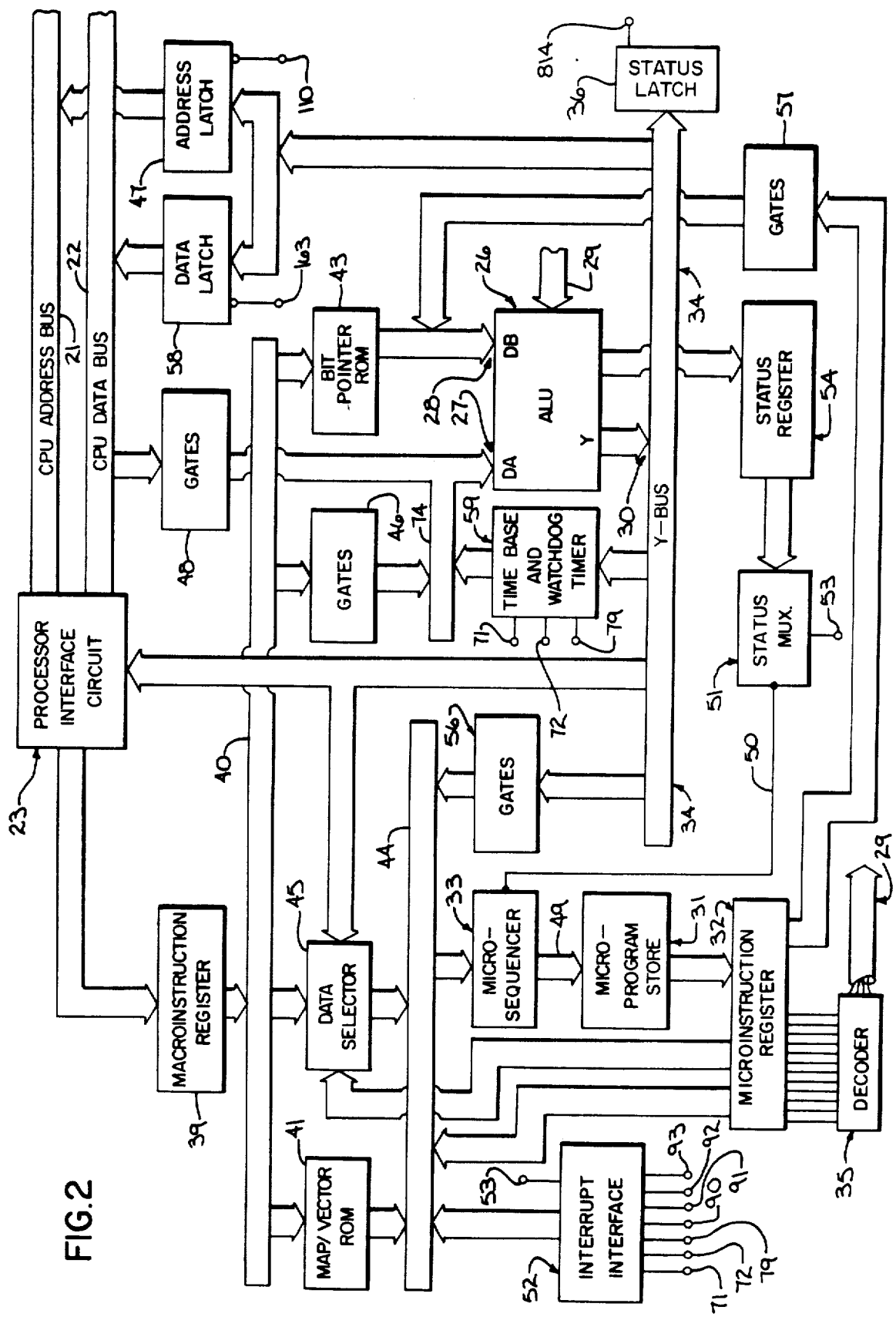
FIG. 2 is a block diagram of the CPU module which forms part of FIG. 1.

Referring particularly to FIGS. 1B and 2, the CPU module 3 is structured around a CPU bus 20 which includes a 16-lead CPU address bus 21 and a 16-lead bi-directional CPU data bus 22. These are coupled to the system backplane bus 1 by a processor interface circuit 23 and they connect to a central processor 24, a read-only memory 25 and the I/O image and data table memory 12. The read-only memory 25 is an 8K × 16-bit high-speed EPROM which stores power-up and house keeping programs, masks, and other constants. This data is read onto the CPU data bus 22 either in response to microinstructions executed by the central processor 24 or in response to a read operation initiated by one of the modules connected to the system backplane bus 1. In the latter case, the data is coupled through the processor interface circuit 23 and backplane bus 1 to the requesting module.

The I/O image and data table memory 12 is a high-speed random access memory organized as 4K × 16-bit words. This memory 12 stores an image of the most often accessed portion of the I/O image table. The central processor 24 accesses the memory 12 to determine the status of system inputs, and the central processor 24 modifies the contents of the memory 12 to effect changes in system outputs. The remainder of the I/O image table is stored in the data table portion 623 of the memory module 2, and the central processor 24 accesses this data as well. The CPU module 3 couples data which indicates "changes" made in the I/O image table through its processor interface circuit 23 to the corresponding I/O image table I/O scanner module 4. The memory 12 also stores data associated with the execution of certain macroinstructions, and in general, it provides storage for data which is to be accessed at high speed.

Referring particularly to FIG. 2, the central processor 24 is a 16-bit, microprogrammed processor which fetches macroinstructions (user control program instructions) from the memory module 2, and decodes each into one or more microinstructions which perform the required operations. The processing of a macroinstruction may also require further access to the memory module 2 or the RAM memory 12 for operands or other required data.

The central processor 24 is structured about an arithmetic and logic unit, ALU 26, which is comprised of four cascaded 4-bit bipolar microprocessor slices (AM2903) manufactured by Advanced Micro Devices, Inc. The ALU 26 includes sixteen internal registers (REG 0-15) and it receives 16-bit data input words at a DA port 27 or a DB port 28. The ALU 26 performs a number of arithmetic and logic functions in response to signals on a control bus 29 and 16-bit data output words are generated at a Y port 30. For a detailed description of the ALU 26 reference is made to "The AM2900 Family Data Book" published in 1979 by Advanced Micro Devices, Inc.

The operation of not only the ALU 26, but also the remaining elements of the central processor 24 is controlled by 56-bit microinstructions which are sequentially read from a microprogram store 31 to a microinstruction register 32. Referring particularly to FIGS. 2, 5A and 5B, the 56-bit microinstructions which control the operation of the central processor 24 are divided into micro fields. Each micro field is a code of one or more bits in length which is decoded to provide control signals to specific elements of the central processor 24. For example, the micro field formed by bits 0-3 of each microinstruction operate a microsequencer 33 to control the order in which microinstructions are read from the microprogram store 31. The micro field formed by bits 12-15 on the other hand, control the arithmetic and logic functions performed by the ALU 26 and the micro field formed by bits 28-31 control the various latches and gates which attach to the ALU Y-port 30 through a 16-bit Y-bus 34. Some of the microinstruction bit lines are attached directly to the elements which they control while others are combined and decoded to provide control signals for various system elements. This decoding circuitry is shown collectively in FIG. 2 as reference number 35 and the resulting control lines from the control bus 29. The actual control lines have not been shown in FIG. 2, but instead, Appendix A lists the function performed by each decoded micro field using the mnemonics in FIGS. 5A and 5B.

Referring particularly to FIG. 2, the macroinstructions from the user control program are read into the central processor 24 through the processor interface circuit 23 and stored in a 16-bit macroinstruction register 39. The macroinstruction register 39 retains the macroinstruction word for reference during the execution of the resulting microroutine. A 10-bit operation code in the macroinstruction is applied through a macro-bus 40 to the address inputs of a map/vector ROM 41, and a 4-bit bit-pointer code is applied to the address inputs of a bit pointer rom 43. The operation code is converted by the ROM 41 to a twelve-bit microaddress which is applied to a microbranch address bus 44. This decoded operation code is employed to address a microroutine which is then executed to perform the functions indicated by the operation code. The four least significant bits of the macroinstruction may also directly drive the four least significant bit leads in the 12-bit microbranch address bus 44 through a data selector 45. The data selector 45 is enabled when special 16-way microbranch instructions are executed that require four bits from the macroinstruction.

The microsequencer 33 is an address sequencer for controlling the sequence of execution of microinstructions stored in the microprogram store 31. During the execution of each microinstruction, the microsequencer 33 provides a 12-bit address on a bus 49 to the microprogram store 31. This address selects one of 4096 microinstructions to be executed next. The address generated by the microsequencer 33 may originate from one of four sources within the microsequencer 33: (1) a microprogram address register, which usually contains an address one greater than the previous address; (2) an external direct input from the microbranch address bus 44; (3) a register/counter retaining data loaded during a previous microinstruction; or (4) a five-deep last-in, first-out stack register which provides return address linkage when executing microsubroutines or loops. The microsequencer 33 is responsive to microinstruction bits 0-3 to perform one of sixteen operations, nine of which are conditioned by a signal on a control line 50. That is, an operation such as a jump is performed only if the control line 50: is at a logic low voltage. The microsequencer 33 is available in integrated circuit form as the AM2910, and for a more complete description of its structure and operation, reference is made to "The AM2900 Family Data Book With Related Support Circuits" published in 1979 by Advanced Micro Devices, Inc.

The control line 50 is driven by a status multiplexer 51 which is controlled by bits 40-43 in each microinstruction. The status multiplexer 51 receives a status signal from an interrupt interface circuit 52 through a control line 53 and it receives status signals from a 4-bit status register 54. The inputs of the status register 54 are driven by the "carry", "overflow", "zero" and "sign" status outputs of the ALU 26. The operation of the microsequencer 33 can thus be conditioned by the status of the ALU 26 or by the existence of an interrupt request from the interrupt interface circuit 52.

Referring still to FIG. 2, a microprogram address may be supplied to the microsequencer 33 through the bus 44 from a number of sources. For example, when a macroinstruction is fetched its operation code is applied to the map/vector ROM 41, and it is converted, or mapped, to a 12-bit microprogram address which is generated on the bus 44. In this manner, each macroinstruction is mapped to its corresponding microroutine. Also, when a jump microinstruction is executed, bits 44-45 of the microinstruction are coupled directly to the bus 44 from the microinstruction register 32. This "target address" identifies the point in the microprogram at which processing is to continue. In addition, a 12-bit microaddress may be coupled from the Y port 30 of the ALU 26 through a set of gates 56. This allows, for example, the target address of a microjump to be calculated by the ALU 26. And finally, microaddress data may be coupled to the microsequencer 33 from a data selector 45 and an interrupt interface 52.

Referring to FIG. 2, the central processor 24 includes other elements which enable it to perform a wide variety of functions. Gates 46 couple data from the bus 40 to the ALU 26, and when enabled for example, they allow the 9-bit operand address which accompanies a bit pointer code to be coupled through the ALU 26 to an address latch 47 and then to the CPU address bus 21. Gates 48 on the other hand, connect the CPU data bus 22 to the DA port 27 on the ALU 26. This enables a 16-bit data word from either the processor interface circuit 23, the I/O image and data table memory 12 or the read-only memory 25 to be applied through the gates 48 directly to the ALU 26. In addition, bits 40-55 of the microinstruction register 32 are coupled to a set of sixteen gates 57 and the outputs of gates 57 are connected to the DB port 28 on the ALU 26. A sixteen bit data word can thus be applied to the ALU 26 "immediately" by a microinstruction. Such a data word might be, for example, a mask which is logically combined with a data word applied to the ALU DA port 27. Also, the output of the ALU 26 may be coupled through the Y-bus 34 to a 16-bit data latch 58, the address latch 47 or the processor interface circuit 23. The data latch 58 connects to the CPU data bus 22 and the output of the ALU 26 can thus be written into the I/O image and data table memory 12. Data can also be output by the ALU 26 to an 8-bit status latch 36. It is through the status latch 36 that the CPU module may drive the backplane fault line 814 to indicate that a major fault has occurred. And finally, the ALU Y-bus 34 connects to the input of a time base and watchdog timer circuit 59. As will now be described in more detail, the output of this circuit 59 also connects to the ALU DA input port 27.

Referring particularly to FIGS. 2 and 4, the time base and watchdog timer circuit provides the system clock signals and the real time clock signals employed in timer macroinstructions. It includes a 20 megahertz single phase clock 60 which drives a clock line 61 through a driver 62. The 20 megahertz clock 60 also drives a 4-bit binary counter 63 which generates a system clock signal on a line 64. The system clock provides a time base of 200, 250 or 300 nanoseconds depending on the type of instruction being executed. The system clock can be inhibited, by a NAND gate 65 which is responsive to a HOLD signal on a control line 66.

The 20 megahertz clock also drives a divider circuit 67 through an inverter 68 and a D-type flip-flop 69. The divider 67 is comprised of a series of dividers and counters which reduce the clock rate to values that provide the desired time bases. More specifically, a time base of one millisecond is generated on a line 70, a time base of 0.01 seconds is generated on a line 71 and a time base of 0.1 seconds is generated on a line 72. In addition, an 8-bit latch 73 connects to the divider 67 to store a 4-bit binary count of the 0.01 second time intervals, a 2-bit binary count of the 0.1 second time intervals and a 2-bit count of 0.5 second intervals. The eight Q outputs on the latch 73 connect to the ALU DA port 27 through bus 74, and when a logic low control signal is received on a line 75, the contents of the latch 73 are read into the ALU 26.

The line 70 increments an 8-bit scan counter 76 which serves as a means for measuring the time required to execute the user's control program. The eight inputs to the scan counter 76 are connected to the eight least significant leads in the Y-bus and 34 and it is preset through a control line 77 to the one's compliment of the maximum allowable scan time prior to each pass through the user's control program. As the user's control program is executed, the counter is incremented in ten millisecond time increments until it overflows, or is again preset at the beginning of the next scan. A NAND gate 78 connects to detect an overflow and it generates a logic low voltage on a control line 79 when this event occurs. As will be explained in more detail below, the control line 79 connects to the interrupt interface circuit 52 to initiate an interrupt when the scan counter "times out". In addition, a set of eight tri-state gates 80 connect to the outputs of the scan counter 76, and when a logic low voltage is applied to control line 81, the contents of the counter 76 is read onto the bus 74 and into the ALU 26. In this manner, the time required to execute the control program, or portions of it, can be measured.

Figure 6:
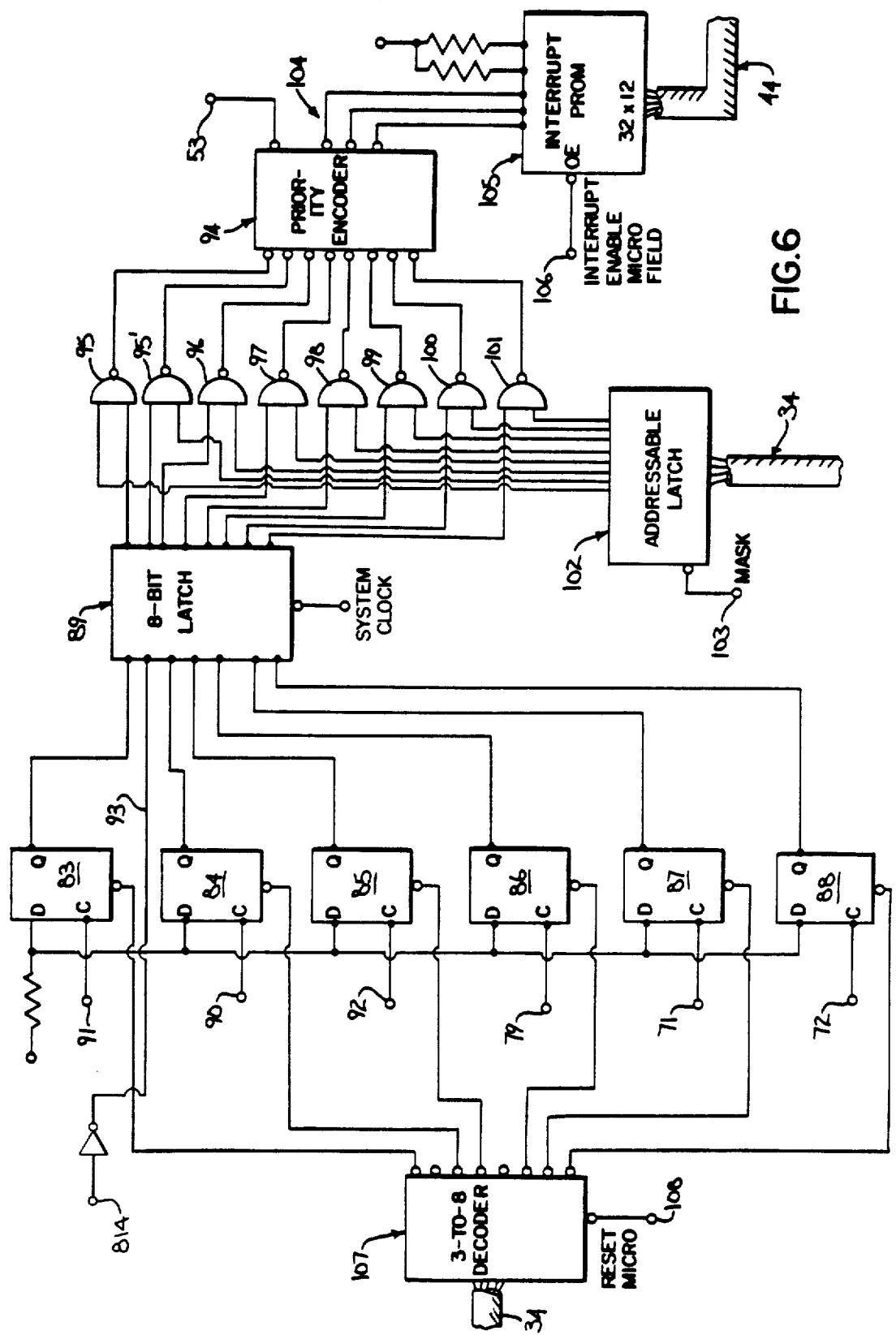
FIG. 6 is an electrical schematic diagram of the interrupt interface circuit which forms part of the circuit of FIG. 2.

Referring particularly to FIGS. 2 and 6, the interrupt interface circuit 52 receives interrupt requests from seven sources, prioritizes them, and generates a code to an interrupt PROM which supplies the starting address on the microbranch address bus 44 of the highest priority service routine. Six of the interrupt requests are received at the clock terminals of respective D-type flip-flops 83-88 and the seventh is applied directly to one input of an 8-bit latch 89. Three of the interrupt requests eminate from the time base and watchdog timer circuit described above to interrupt processing when the allowable scan time has been exceeded or when the 0.01 second real-time clock has "ticked" or when the 0.1 second real-time clock has ticked. A fourth interrupt request eminates from a line 90 in the backplane bus when a module attached thereto requests an interrupt, and a fifth interrupt is requested by line 91 when a.c. power failure is detected. The remaining two interrupts are fault related. The first appears on line 92 when an error is detected during a read or write operation to the system backplane bus 1 and the other appears on line 93 when a major fault such as a memory parity error occurs on the backplane fault line 814.

Any interrupt requests remain in the respective flip-flops 83-88 unitl serviced. The Q outputs of flip-flops 83-88 are connected to inputs on the latch 89 and the interrupt requests are latched in synchronizm with the 5 MHZ system clock. The eight latch outputs are coupled to a priority encoder 94 through respective NAND gates 95-101.

The NAND gates 95-101 enable interrupt requests to be masked. A second input on each connects to a respective output of an eight-bit addressable latch 102 which has its three latch select inputs and its data input connected to the Y-bus 34. When a control line 103 is driven low, a selected one of the NAND gates 95-101 may be either enabled or disabled (i.e. mask the interrupt) by data which is output from the ALU 26 to the addressable latch 102.

The priority encoder 94 generates a three-bit binary code at its outputs 104 which identifies the highest priority interrupt applied to its eight inputs. A EO output on the priority encoder 94 connects to the control line 53 and it is driven high if any interrupts are requested. The outputs 104 connect to the address inputs of the interrupt PROM 105, and the 3-bit code thereon is mapped to the starting address of the corresponding interrupt service microroutine. When the interrupt PROM 105 is enabled by control line 106, this address is applied to the bus 44 and loaded into the microsequencer 33.

After an interrupt has been serviced the request is reset. Referring still to FIG. 6, this is accomplished by a 3-line-to-8-line decoder 107 which has its three inputs connected to leads 0-2 in the Y-bus 34. Six of its outputs are connected to reset terminals on respective flip-flops 83-88, and when enabled by a control line 108, the flip-flop indicated by the 3-bit code on the Y-bus 34 is reset. The interrupt indicated on line 93 requires a manual reset following correction of the indicated fault.

It should be apparent that the interrupt interface circuit 52 may be expanded to enable additional interrupt input events and that the nature of the interrupt events can be easily changed by altering the contents of the interrupt PROM 105.

There are certain functions performed by a programmable controller which to a great extent determine its capacity in terms of the number of I/O points it can support. The preferred embodiment described herein is intended to service up to 4096 input points and 4096 output points without degradation of the scan time (i.e. the time needed for a single execution of the user control program). This is accomplished in part by maintaining the I/O image and data table in the memory 12, which is not only constructed using high speed memory devices, but which is also physically located on the same circuit board as the central processor 24. Most operations performed by the central processor 24 involve this local high speed memory, because most instructions in the typical user control program require the examination of a single bit in the I/O image table or the setting of a single bit in the I/O image table. The separation of the CPU bus 20 from the system backplane bus 1 and the use of local high speed memory therefore substantially enhances the speed of the CPU module 3.

As indicated above, it is the function of the system I/O bus interface module 6 and the I/O scanner module 7 to periodically update the state of the I/O image table in the memory 12 and it is a function of the central processor 24 to fetch control instructions (i.e. macroinstructions) from the memory module 2. These functions require bi-directional communications between the central processor 24 and the system backplane bus 1. Also, because a number of asynchronously operating modules are connected to the system backplane bus 1, an arbitration means must be provided to allocate the backplane bus 1 to the requesting system module or the central processor 24 in accordance with a preselected priority scheme.

Figure 3A:
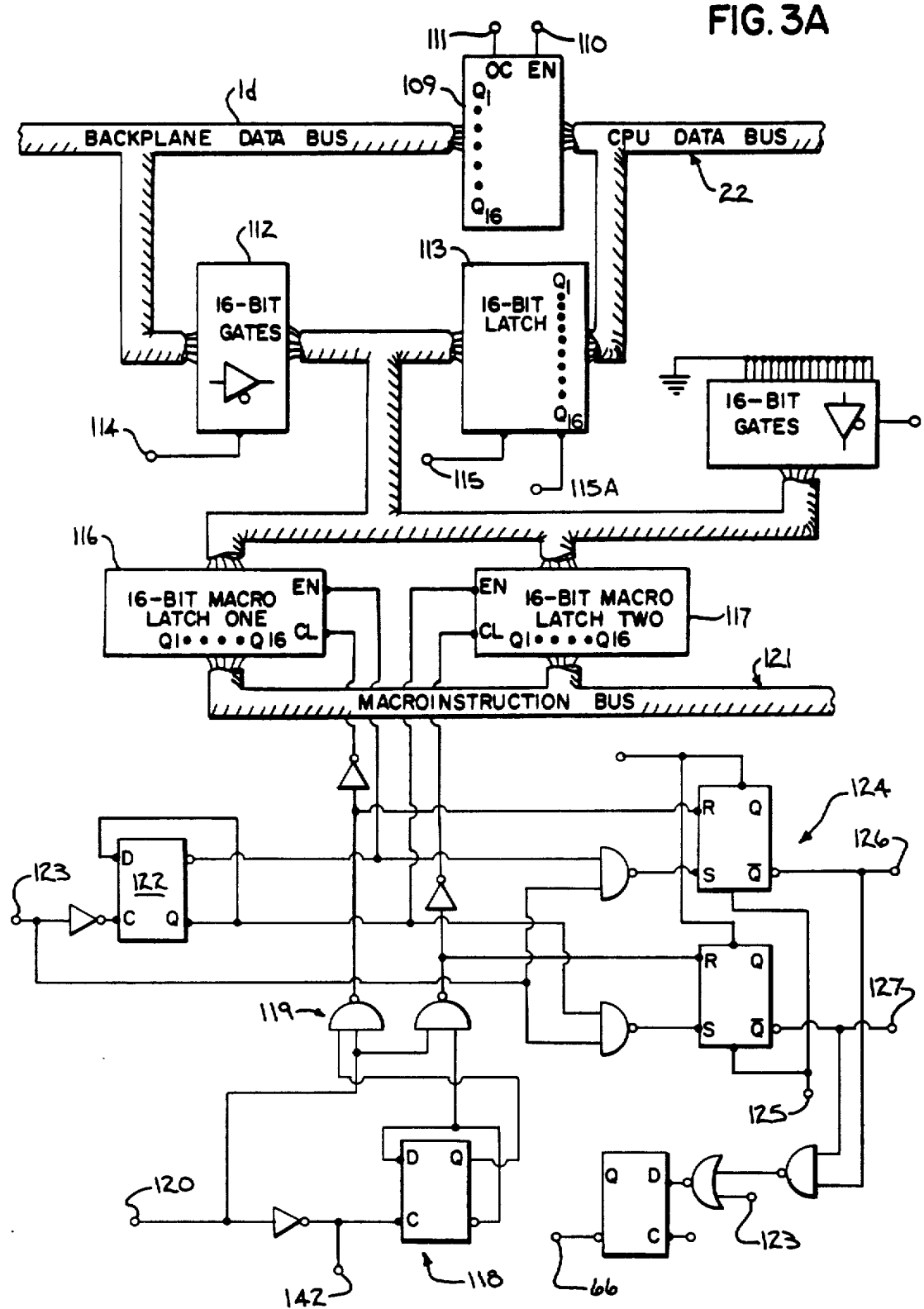
FIGS. 3A-3D are electrical schematic diagrams of the processor interface circuit which forms part of the circuit of FIG. 2.

These functions are performed by the processor interface circuit 23. Referring particularly to FIGS. 1, 2 and 3A, the sixteen leads in the CPU data bus 22 are coupled to the sixteen leads in the system backplane bus 1d by a 16-bit latch 109. Data is clocked into the latch 109 from the bus 22 when a control line 110 goes high and this data is applied to the backplane data bus 1d when a control line 111 becomes active. On the other hand, a set of sixteen tri-state gates 112 and a latch 113 couple the backplane data bus 1d to the CPU data bus 22. When enabled by control lines 114 and 115 data from the backplane bus 1 may be coupled through the gates 112 and the latch 113 and written to an addressed destination in the central processor module 24. It is in this manner, for example, that the system I/O bus interface module 6 updates the I/O image and data table memory 12 with changes occurring at input points in the I/O racks 16.

In addition to coupling the respective data buses 1d and 22, the gates 112 also input control program macroinstructions which are fetched from the memory module 2. These macroinstructions are applied to the inputs of a first macro latch 116 and to the inputs of a second macro latch 117. As fetched macroinstructions are received, they are alternately loaded into the respective latches 116 and 117. This enables macroinstructions to be "prefetched" so that the central processor module 24 can operate at maximum speed without waiting for the next macroinstruction. Control of the latches 116 and 117 is accomplished by a flip-flop 118 and a pair of NAND gates 119. The flip-flop 118 serves to alternately clock the latches 116 and 117 and to time the clock pulse such that the macroinstruction is latched properly when received from the memory module 2. As a result, when a macroinstruction is fetched, a control line 120 becomes active and one of the two NAND gates 119 is momentarily gated to clock one of the latches 116 or 117.

The output of the latches 116 and 117 connect to the leads in a macroinstruction bus 121 which connects to the inputs of the macroinstruction register 39. A flip-flop 122 connects to the enable terminals on the respective latches 116 and 117, and the contents of the latches are alternately output to the macroinstruction register 39 in response to signals on control line 123. A set of flip-flops and gates indicated generally at 124 keep track of macroinstructions loaded into and read out of the latches 116 and 117, and if a request is made for another macroinstruction and none is available, an active signal is generated on the control line 66 to disable the central processor clock (see FIG. 4). The central processor is thus held in an idle state until another macroinstruction is received from the memory module 2. Control lines 126 and 127, which also emanate from this circuit, indicate when either of the latches 116 or 117 is empty, and as will be described below, these signals initiate a prefetch of another macroinstruction when either of the macro latches 116 or 117 is empty.

As long as the control program macroinstructions are executed in sequence, the subsequent macroinstructions are prefetched to the macro latches 116 and 117 and are available when needed by the central processor 24. However, when the control program deviates from a straight sequential execution of macroinstructions, as occurs during a jump or branch, the prefetched macroinstructions in the latches 116 and 117 are of no use. When this occurs, a control line 125 is enabled and the flip-flops 124 are reset to indicate that no macroinstructions are available for execution.

Figure 3B:
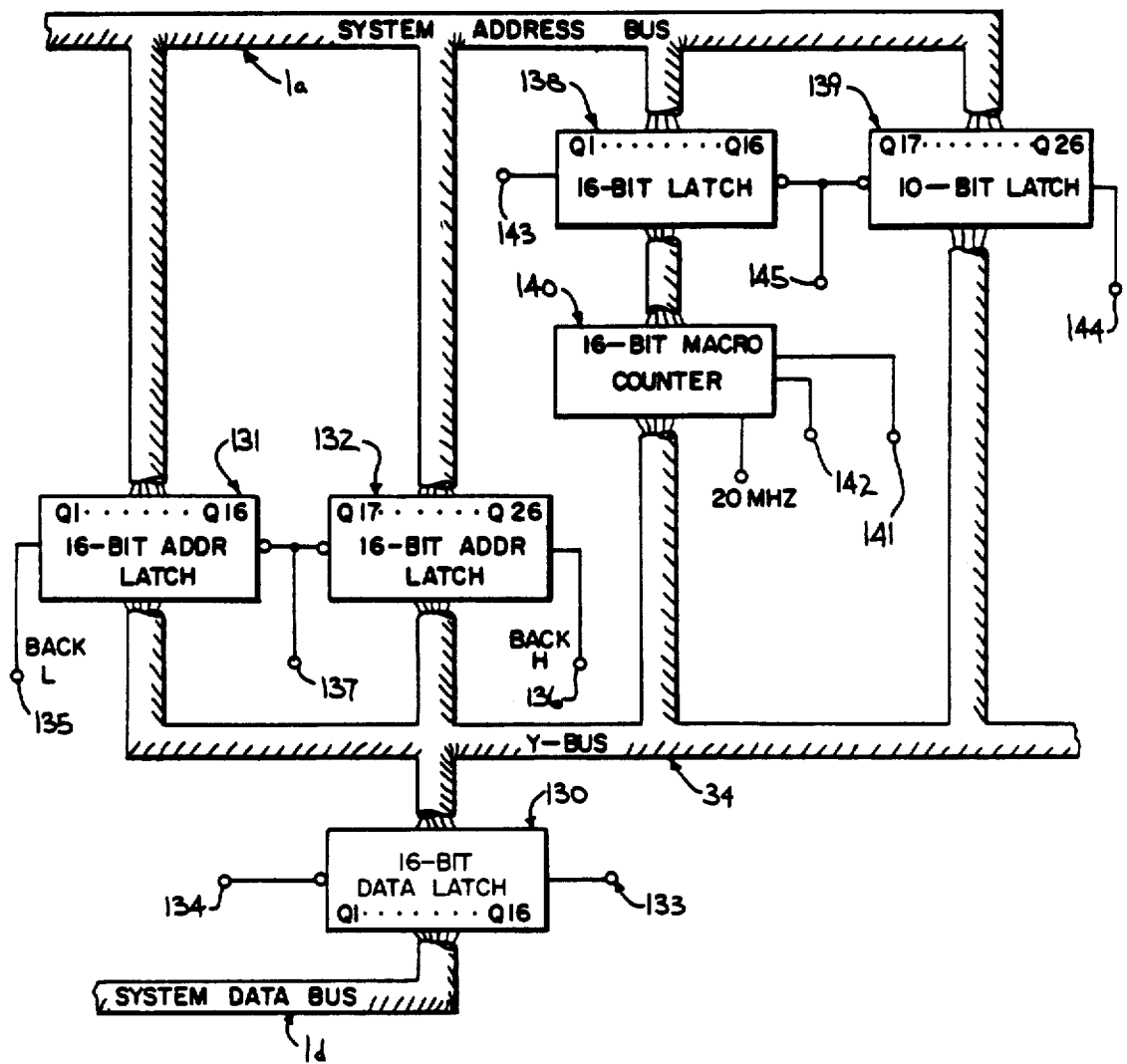

Referring particularly to FIGS. 2 and 3B, the ALU Y-bus 34 is also coupled to the system backplane bus 1 through the processor interface circuit 23. It connects to the system data bus 1d through a 16-bit data latch 130 and it connects to the system address bus 1a through a pair of address latches 131 and 132. The data latch 130 is loaded with data which is output from the ALU 26 when a control line 133 is active (i.e. micro-bits 28-31-=BACKD) and this data is written onto the backplane data bus 1d when a control line 134 is active. Similarly, address data is output to the respective latches 131 and 132 when control lines 135 and 136 are active (i.e. micro-bits 28-31=BACKL or BACKH) and this 26-bit address is applied to the backplane address bus 1a when a control line 137 is active. Data and addresses can thus be generated directly by the ALU 26 for application to the backplane bus 1, and hence to other modules in the system.

Control program macroinstructions stored in the memory module 2 are addressed by the CPU module 3 by means of data stored in a 16-bit latch 138 and a 10-bit latch 139. The inputs of the 10-bit latch 139 are connected directly to leads in the Y-bus 34, however, the inputs to the 16-bit latch 138 are driven by a 16-bit "macro" counter 140. The macro counter 140 may be preset to an address generated by the ALU 26 on the Y-bus 34 when a control line 141 is active (i.e. micro-bits 28-31=FETCH) and the counter 140 is incremented each time a macroinstruction is fetched. This is accomplished by a control line 142 which emanates from the clock terminal of flip-flop 118 (see FIG. 3A). The contents of the macro counter 140 are loaded into the latch 138 when control line 143 becomes active, and the 10-bit latch 139 is loaded with high order address data from the Y-bus 34 when the control line 144 becomes active. The resulting 26-bit address is applied to the backplane address bus 1a when the central processor module 24 obtains access to the backplane bus 1 and a control line 145 becomes active.

Figure 3C:
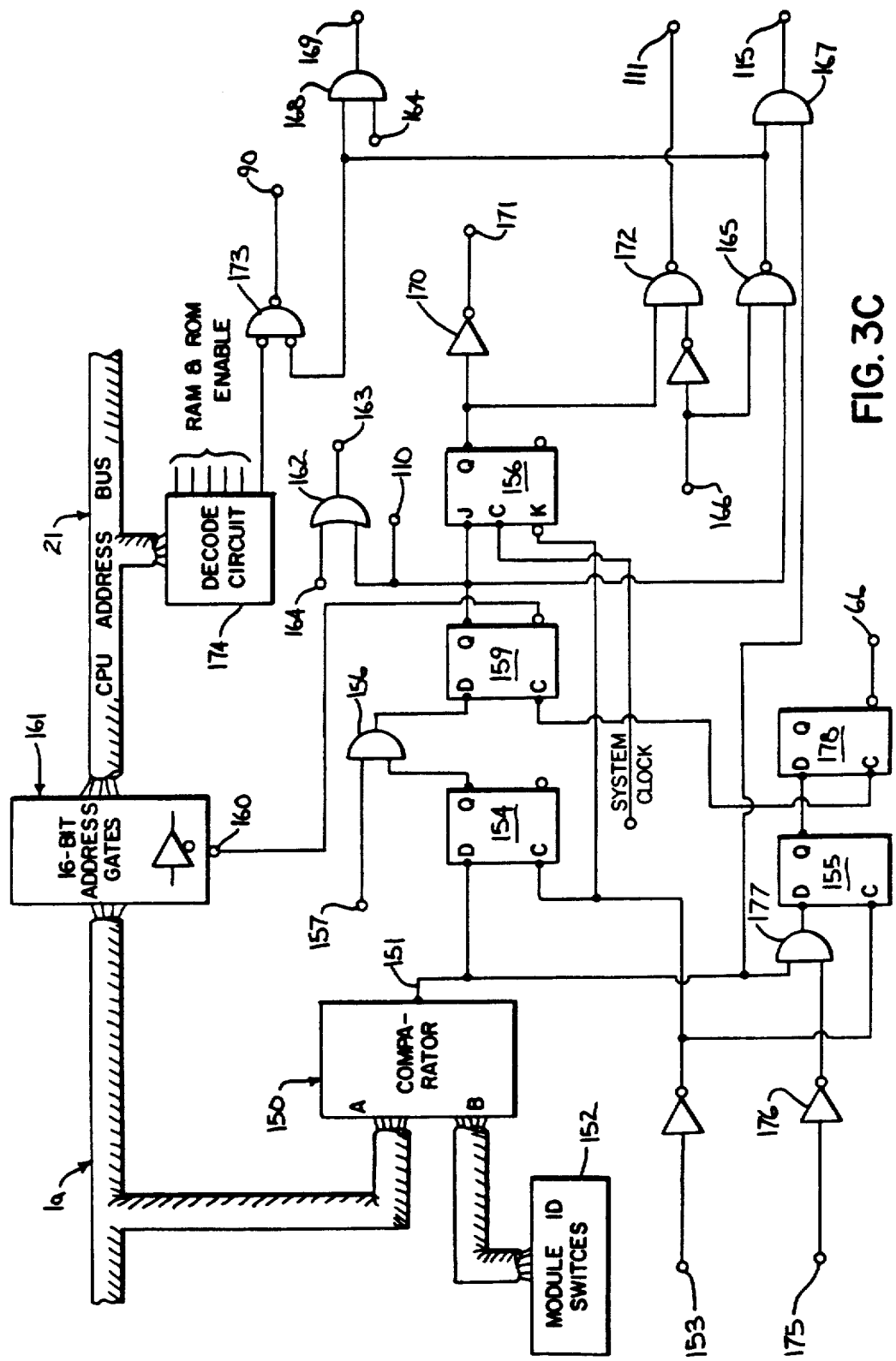

Referring to FIGS. 2 and 3C, a module connected to the system backplane bus 1 accesses the CPU module 3 by asserting an address within a preselected range on the address bus 1a and asserting the proper signals on the system backplane bus control lines. Ten of the most significant digit leads in the system address bus 1a couple to the "A" inputs of a comparator circuit 150, and when the CPU module 3 is addressed by another module, the comparator 150 generates a logic high voltage at an output 151. A set of module ID switches, or jumpers 152, connect to the "B" inputs of the comparator and these serve as a means for preselecting the CPU access address range.

The module requesting access to the CPU module 3 also asserts a logic low voltage on a backplane control line (XCMD) 153 to indicate that valid data is present on the backplane bus 1. This signal is inverted and applied to the clock terminals on two D-type flip-flops 154 and 155 and to the K terminal on a J-K flip-flop 156. The output of the comparator 150 is thus clocked into the flip-flop 154 and applied to one input of an AND gate 156. A second input 157 on AND gate 156 connects to receive bit 4 from the microinstruction register 32, and if access to the CPU module 3 is to be blocked, it is set low. Otherwise, the output of AND gate 156 is clocked into a second D-type flip-flop 159.

The Q and $\overline{Q}$ outputs on the second D-type flip-flop 159 enable a number of elements in the CPU module 3. The $\overline{Q}$ output connects to an enable terminal 160 on a set of sixteen address gates 161 and a sixteen bit address is thus applied to the CPU address bus 21 when access to the CPU module 3 is obtained. The Q output of flip-flop 159 connects directly to control line 110 to disable the address latch 47 (FIG. 2) and to enable the inputs of the latch 109 (FIG. 3A). In addition, this Q output connects through an OR gate 162 to a control line 163 which disables the data latch 58 (FIG. 2) when external access is granted. A second input on the OR gate 162 is driven by a control line 164 which becomes active during a central processor write operation (i.e. micro-bits 35-37). The Q output on flip-flop 159 also connects to one input of a NAND gate 165. The second input on this NAND gate 165 is driven by a control line 166, and when data is to be read by the CPU module 3, the output of gate 165 is driven low. The output of gate 165 drives a pair of AND gates 167 and 168. The AND gate 167 in turn drives the control line 115 which controls latch 113 (FIG. 3A) and the AND gate 168 drives a CPU WE control line 169. When a module on the system backplane bus 1 writes to the CPU module 3, therefore, the control lines 115 and 169 are driven low.

The J-K flip-flop 156 is set shortly after the flip-flop 159 by the system clock applied to its clock terminal. The Q output on a flip-flop 156 connects to an inverter gate 170 that drives a backplane acknowledge (XACK) control line 171. The signal thus generated on the XACK control line 171 indicates to the requesting module that the CPU module 3 has received its request and that valid data is on the system bus 1. The flip-flop 156 also drives a NAND gate 172, and if a read operation is indicated by the backplane read/write line 166, the output of this gate 172 is driven low to enable the outputs of latch 109 (FIG. 3A) through control line 111. The flip-flops 154 and 156 are reset by the backplane control line XCMD 153 and the signal is removed from the XACK control line 171 by the flip-flop 156 to indicate that the data transfer is complete.

Referring to FIGS. 2 and 3C, in addition to reading from or writing to the CPU module 3, an external module may also interrupt the central processor 24 or force it into a "hold" state. An interrupt request is accomplished by writing to a specific address which causes an interrupt request to be generated on a line 90 by a NAND gate 173. One input to this gate 173 is enabled low by the NAND gate 165 when a backplane write operation is indicated, and its other input is enabled low when the preselected interrupt address is present on the CPU address bus 21. A decoder circuit 174 detects not only this interrupt address, but it also decodes other addresses on the bus 21 to generate appropriate chip enable signals to the I/O image and data table memory 12 and the read only memory 25.

An external module may also place the central processor 24 in "hold" by asserting a logic low voltage on a backplane control line (CPU HOLD) 175. This signal is coupled through an inverter gate 176 and AND gate 177 to the D input of the flip-flop 155. The Q output of flip-flop 155 connects to the D input of another D-type flip-flop 178 and the Q output on this flip-flop 178 connects to the hold control line 66 to disable the system clock (FIG. 4). The central processor 24 remains in the hold condition until another backplane command is generated to reset the flip-flops 155 and 178.

Figure 3D:
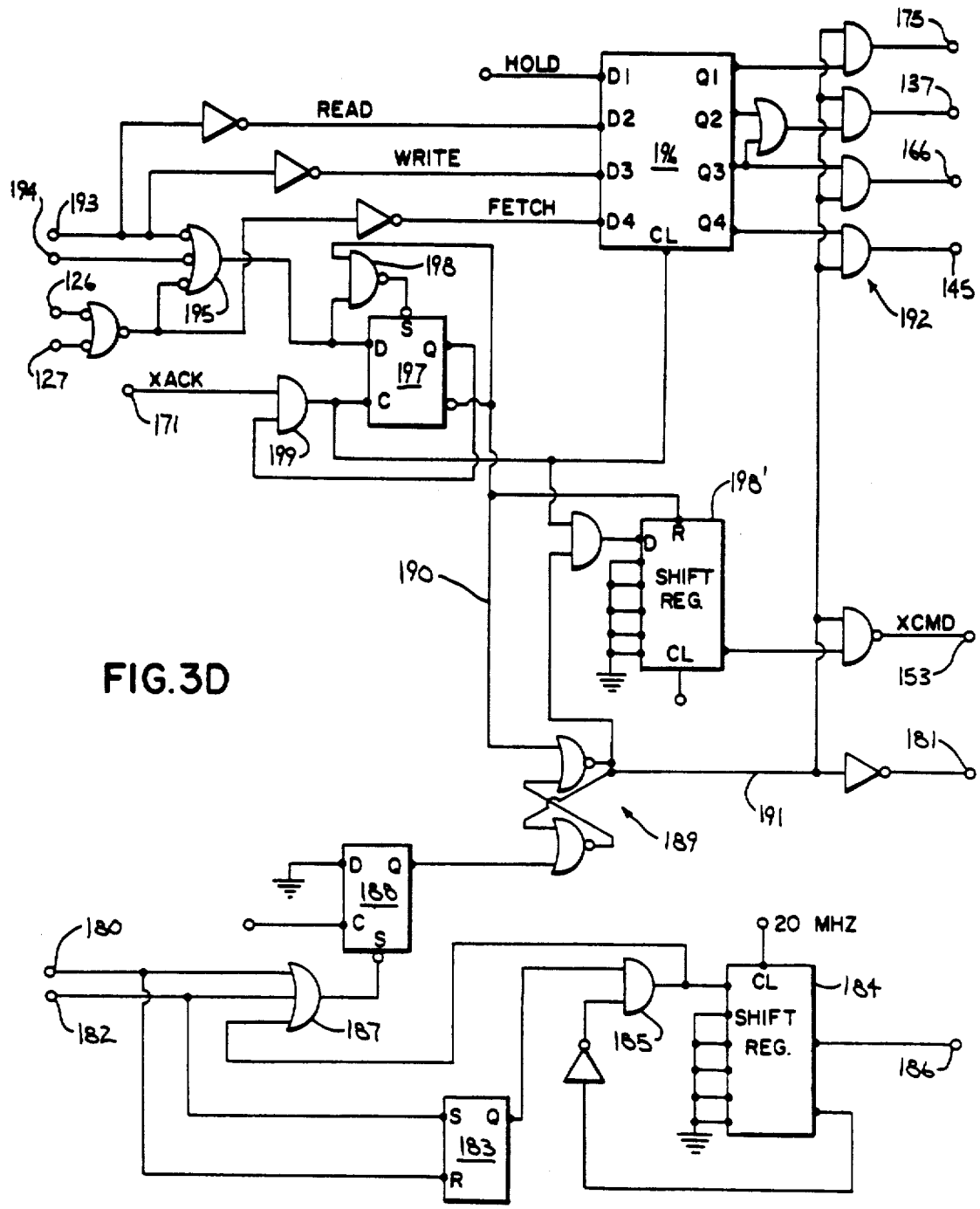
Figure 19:
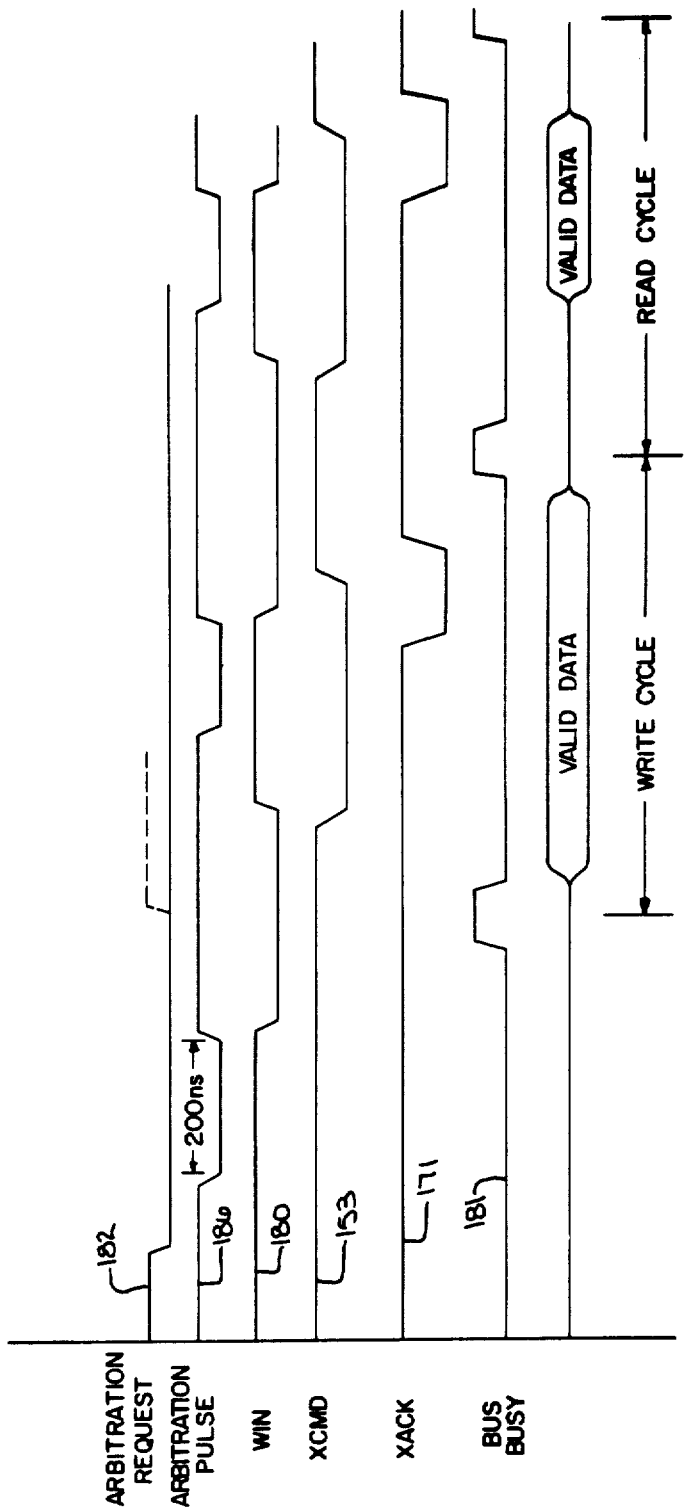
FIG. 19 is a timing diagram which illustrates a write cycle and a read cycle on the system backplane buses which form part of the system of FIG. 1.

Referring particularly to FIGS. 2, 3D and 19, the central processor 24 contains circuitry for determining which module in the programmable controller may have access to the backplane bus 1. An arbitration request control line 182 connects to each module on the backplane bus 1 and when a module wants access, it asserts an arbitration request logic signal to the arbitration circuit on the central processor 24. This signal sets a flip-flop 183, which in turn applies a logic signal to a shift register 184. The shift register 184 generates a 200 nanosecond arbitration pulse on a backplane control line 186, and as will be described in more detail hereinafter, the requesting module having the highest priority will respond to this pulse by asserting a signal on a WIN control line 180. The successful module will then assert a "bus busy" signal on a backplane control line 181 and initiate a data transfer.

The central processor module 24 may gain access to the backplane bus 1 when no other module in the programmable controller needs it. Referring to FIG. 3D, this condition is sensed by an OR gate 187 which sets a flip-flop 188 when the backplane bus 1 is not requested by another module. The flip-flop 188 drives a pair of NOR gates 189 and when the central processor module 24 wants access, as indicated by the logic state of a WANT control line 190, a logic high enabling signal is generated on an IGOT control line 191. The IGOT control line 191 drives the BUS BUSY control line 181 and it enables a series of AND gates 192 which couple the processor module 24 to the backplane HOLD control line 175, the control line 137 (see FIG. 3B), the backplane read/write control line 166 and the control line 145 (see FIG. 3B).

The WANT control line 190 is enabled whenever the central processor module 24 requires the backplane bus 1 to perform a read operation, a write operation or a macroinstruction FETCH. A BACK READ control line 193 is enabled when a BACKR microcode is executed and a BACK WRITE control line 194 is enabled when a BACKW microcode is executed. These signals along with the macroinstruction buffer empty signals on lines 126 and 127 are applied to an OR gate 195 and to the respective inputs of a quad D-type flip-flop 196. The output of the OR gate 195 drives a D-type flip-flop 197 which is set by a NAND gate 198 when access is desired and the flip-flop 197 generates a logic low signal on WANT control line 190. This logic low voltage releases a shift register 185 from reset and a logic high voltage is generated by the flip-flop 197 to an AND gate 199 to clock the quad flip-flop 196. The contents of the quad flip-flop 196 is gated to the respective control lines 175, 137, 166 and 145 by the AND gates 192, and a short time thereafter, the XCMD backplane control line 153 is activated by the output of the shift register 185 to indicate that valid data is on the system backplane bus 1. When the module with which the central processor module 24 is communicating acknowledges that the data transfer has occurred, the backplane control line XACK 171 rises to a logic high voltage to clock the flip-flop 197 and to thereby either initiate another transfer or reset it.

Referring particularly to FIG. 19, the arbitration process is performed concurrently with the transfer of data between modules. That is, prior to the completion of a read or write cycle on the backplane bus 1, the arbitration process has already occurred and the highest priority module desiring access to the backplane bus 1 has been found and is ready to perform a read or write operation when the bus becomes available. Bus availability is indicated by a logic high on the bus busy control line 181 and shortly thereafter the new "master" module of the backplane bus initiates a read or write cycle. The master module drives the XCMD control line 153 low to indicate that a valid address is on the backplane bus 1 and the addressed "slave" module responds by driving the XACK control line 171 low. The XCMD control line 153 is released by the master module shortly thereafter and the slave module responds by releasing the XACK control line 171 to complete the read or write cycle.

Any module, except the CPU module 3, can request arbitration by driving the control line 182 low. As described previously, this causes an arbitration pulse to be sent to all modules through the control line 186, and the highest priority module will drive the WIN control line 180 low to terminate arbitration. That module will then take control of the backplane bus 1 when the bus busy control line 181 goes high.

Referring particularly to FIGS. 1, 2, 12 and 13, when the CPU module 3 is powered up it operates in one of five possible modes. In mode 1 the CPU module 3 is not processing, but is waiting for other modules in the system to initialize. In mode 2, it is waiting for the I/O scanner module 7 to perform a "prescan" which initializes the I/O image and data table memory 12 and the data table in the memory module 2. In mode 3 the CPU module 3 performs a "program prescan" in which the control program is executed, but all output devices are disabled. Mode 4 is the "run" mode in which the control program is executed to operate the devices connected to the programmable controller, and mode 5 is the program load mode in which the control program is entered and edited from the terminal 8. The current CPU mode is stored in the CPU ram 12 and in the system status portion of the memory module 2.

Figure 12:
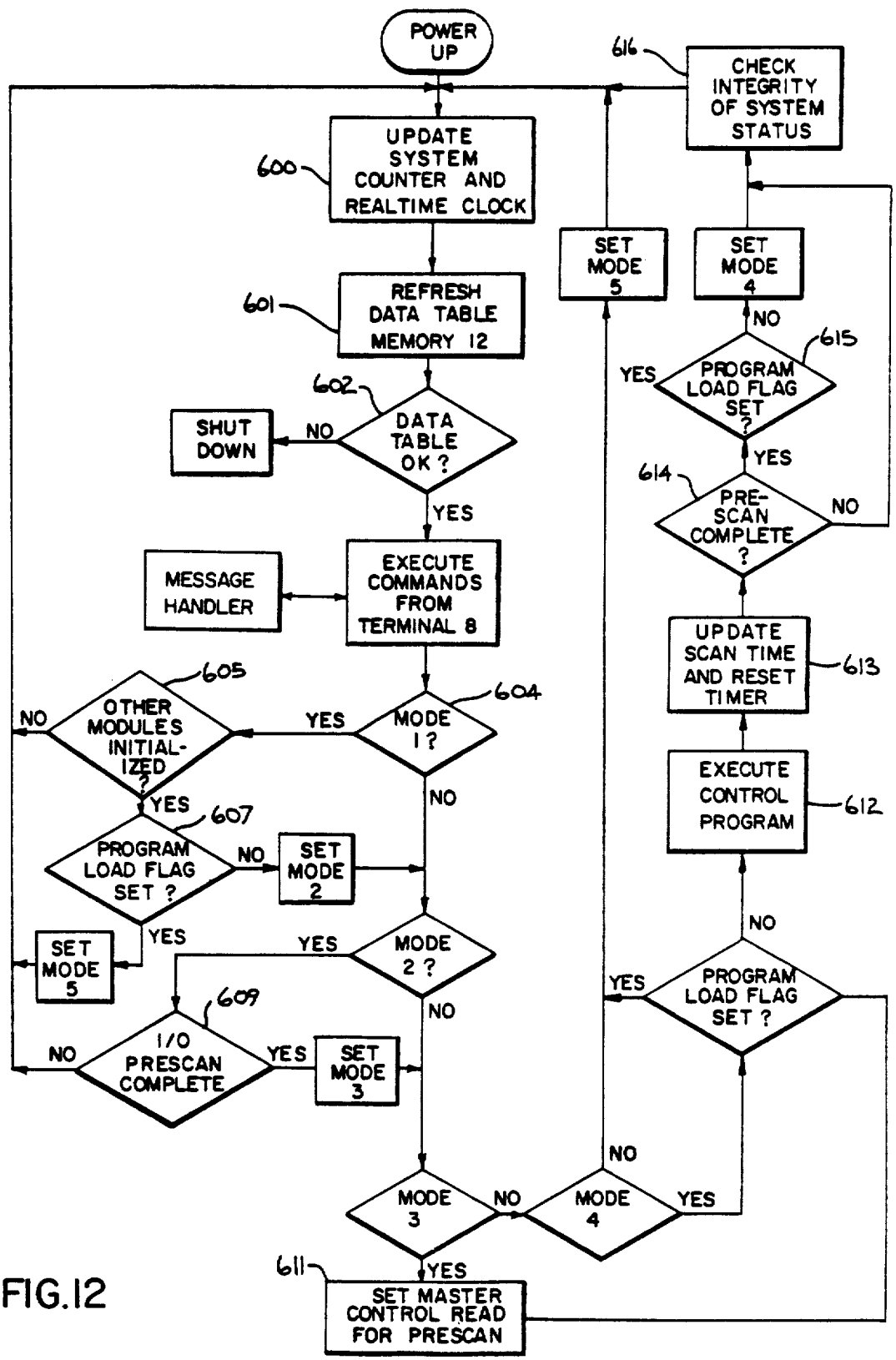
FIG. 12 is a flow chart of the functions performed by the CPU modules of FIG. 1.

Referring particularly to FIGS. 12 and 13, regardless of the mode of operation, the CPU module 3 periodically performs a number of housekeeping chores. As indicated by process block 600, a set of instructions are executed to increment the system counter and the real time clock which are both stored in the system data portion 620 of the memory module 2. The system counter indicates to other modules in the system that the CPU module 3 is functioning and the real time clock provides day and time information. As indicated by process block 601 the CPU module 3 then refreshes certain data in its memory 12. More specifically, it reads data from the access control block portion 621 of the memory module 2 which indicates the memory location of various portions of the control program and the data table stored in the memory module 2. These "pointers" are maintained in the CPU memory 12 to reduce the time required to access data in the memory module 2 during execution of the control program. If this data is in error, as indicated by decision block 602, the CPU module is shut down and all output devices are disabled. Normally, however, the CPU module 3 next executes commands it has received from the terminal 8 as indicated by process block 603. As will be explained in more detail hereinafter, the CPU module 3 includes a message handler routine which communicates with other backplane modules, and which couples command messages from the module that supports the terminal 8. Such commands may be, for example, editing commands which call for the deletion or addition of instructions in the control program.

Referring still to FIGS. 12 and 13, after these housekeeping functions have been performed, the CPU module 3 determines which mode it is operating in and performs the functions required. Immediately following power-up the CPU module is in mode 1 as determined by decision block 604, and the only function performed is to determine if the other modules in the system have been initialized and are ready to run. This is determined by instructions indicated by decision block 605 which examine the system status counter 606 stored in the system data portion of the memory module 2. As will be explained in more detail hereinafter, the system I/O scanner module 7 is responsible for setting the system status counter 606 to the number of modules present during power-up. As each module initializes itself, it decrements the system counter. Until this counter is decremented to zero, the CPU module 3 remains in the mode 1 loop comprised of blocks 600–605.

When all system modules have initialized the CPU module 3 may switch to mode 2. Before doing so, however, a check is made to determine if the system has been set to the "program load mode." This is indicated at decision block 607 and is accomplished by examining the system mode field 608 in the system status portion 620 of the memory module 2. As will be explained in more detail hereinafter, it is another one of the functions of the system I/O scanner module 7 to monitor the front panel switches through the front panel interface module 11 and to maintain the system mode field 608.

In mode 2 the CPU module 3 waits for the I/O scanner module 7 to perform an I/O prescan in which the data tables in both memory module 2 and CPU ram 12 are initialized to the current state of all input devices connected to the programmable controller. Instructions indicated by decision block 609 are executed to examine an I/O prescan counter 610 in the system status portion of memory module 12. Each I/O scanner module 7 and system I/O bus interface module 6 in the system decrements this I/O prescan counter 610 when it has completed its prescan, and when the counter 610 reaches zero, the CPU module 3 switches to mode 3.

In mode 3 the CPU module 3 executes a "prescan" of the control program to build a table of target addresses for jump instructions and subroutine calls as described in U.S. Pat. No. 4,115,853. As indicated by process block 611, a master control relay is first set by the CPU module 3 to insure that all logic decisions made during the control program prescan are false and that no output devices are energized. Also, during the prescan no branches jumps or subroutine calls are executed to insure that each and every instruction in the control program is fetched and executed. As indicated by process block 612, each control program instruction is fetched from the memory module 2, mapped to the proper microprogram in the CPU module 3 and executed. The last microinstruction in each microprogram includes a FETCH code which directs the CPU module 3 to read the next control program instruction from the memory module 2.

This sequence continues until the END instruction is fetched. The END instruction functions to reset the control program counter to the start of the control program and to read the scan counter 76 (FIG. 4). The scan counter 76 is reset to zero and the scan time is saved in the system data section (FIG. 13) as indicated by process block 613 in FIG. 18. The scan time is a measure of the time required to execute the control program and is particularly useful in time-critical applications where the effects of changes to the control program during program development cannot be easily predicted.

Referring still to FIG. 12, if the control program prescan is complete as determined at decision block 614, the CPU module 3 is ready to run. First, however, a check is made at decision block 615 to determine if the program load mode has been requested, but if not, the module is set to mode 4. Regardless of the mode, after the control program has been executed a check is made of the system data section to determine if any major fault conditions have occurred as indicated at process block 616. The system loops back to commence another scan if no problems exist. Otherwise, the system shuts down.

Referring particularly to FIG. 1, the control program instructions, or "macroinstructions," are loaded into the memory module 2 using the terminal 8. The terminal 8 operates in combination with the peripheral processor module 5 to not only load macroinstructions into the memory module 2, but to also edit the resulting control program and to monitor the system operation as the control program is being executed by the CPU module 3. As will become more evident from the description to follow, a number of macroinstructions infer or expressly define operands, which are stored in the I/O image and data table memory 12. This memory 12 is on the CPU module 3 and is constructed of very high speed devices which enable the macroinstructions to be executed more efficiently. Typically, each macroinstruction is prefetched by the CPU module 3 from the memory module 2 and it is held until the previous macroinstruction has been executed. When that is completed, the macroinstruction operation code is mapped to a stored microprogram which carries out the indicated functions. Typically, the function is carried out with one or more operands located in the I/O image and data table memory 12.

The macroinstruction set includes many instructions which are common to programmable controllers such as bit manipulating instructions and timers and counters. Others are less common and some are unique either in the function they perform or the manner in which they perform the function. The macroinstruction set can be grouped into a number of subsets as set forth in Table A.

Referring particularly to FIGS. 14a-14e, each macroinstruction includes an operation code and an operand or operand address. The "rung control" and "program control" macroinstructions are one 16-bit word in length and each includes an 8-bit operation code. The rung control instructions also include an 8-bit offset number which may be added to the macroinstruction counter to branch around control program instructions which are not to be executed. The program control instructions include an 8-bit label number which identifies an entry in the label table which is stored in the CPU ram 12 and which is created during the control program prescan.

The "test/control bit" macroinstructions are formed by a 16-bit word containing the 8-bit operation code and a 4-bit pointer code followed by one or more operand address words. "Timer/counter" macroinstructions are similar except they include a 7-bit timer/counter number and a single bit (L) which indicates whether or not the macroinstruction includes additional words for addressing beyond the range of the 7-bit timer/counter number.

The "arithmetic/logic" instructions are more complex. In addition to the first word which contains the 8-bit operation code, they include one or more words which indicate the address of a first source of data, a second source of data and a destination for the output of the arithmetic or logical operation. The first word of the arithmetic and logic instructions also includes a bit (I) which indicates if any of the data to be operated upon is floating point and a bit (F) which indicates if any of the data to be operated upon is more than one word (i.e., a file). The remaining 5 bits in the first word indicate the total number of words in the macroinstruction. If a data file is operated upon as indicated by the F bit, the first word in an arithmetic or logic macroinstruction is followed by one or more file control words which indicate how the file is to be processed.

The address structure referred to above in connection with FIGS. 14c-14e is shown in more detail in FIG. 15. It is comprised of one or two words as determined by a single bit (L) in the first word. Another bit (F) in the first word indicates if a file is being addressed and the first four bits of the word indicate which of the sixteen sections of the data table is being addressed. The remaining ten bits of the first word identify a location in the indicated data table section or they form the most significant bits of a much larger address when a second word is present in the structure. The structure of the data table portion of the memory module 2 is shown in FIG. 13d and it should be apparent from the above description that the size of any of the sixteen sections of this data table can range to a very large capacity.

When arithmetic or logic macroinstructions operate on a file, they require a file control word shown in FIG. 14e. The structure of such file control words is shown in more detail in FIG. 16. The structure is comprised of one or two words as determined by the first two bits of the first word and the same two bits determine in which of two modes, complete or distributed complete, the file is to be operated upon. In the complete mode the file control word is a transfer number which indicates the number of words to be operated upon in the indicated file or files. Each time the macroinstruction is executed, the arithmetic or logic operation is sequentially performed on the number of words in the file indicated by this number. In contrast, the distributed complete mode of operation requires a rate number in addition to the transfer number, and each time the macroinstruction is executed, only the number of words indicated by the rate number are operated upon. This continues until the total number of words indicated by the transfer number are operated upon. The distributed complete mode of operation on a data file enables the operations to be distributed over a number of scans so that the control program scan time is not excessive when an operation on a large data file is made.

Referring particularly to FIG. 17, for each timer and counter required by the control program there exists a three-word data structure in the timer or counter sections of the data table stored in memory module 2. This structure includes a control word which indicates the status of the timer or counter, a preset value word, and an accumulated value word. The accumulated value word stores the number of counts or time increments which have taken place and the preset value word stores the total with which the accumulated value is compared.

TABLE A
MACROINSTRUCTION SET

1. Rung Control Instructions

STRT — Transparent "start of rung" instruction which includes a program counter offset to the first conditional or branch output instruction in the rung. It sets the condition of the rung to the state of the master control relay (MCR) and it provides the information needed to skip instructions that need not be executed.

STMC — Same as STRT, but it sets the rung condition true irrespective of the MCR or ZCL state.

BST — Defines the start of a branch in a rung and includes a program counter offset to the next NXB instruction to allow skipping of instructions in a false branch.

NXB — Defines the start of another branch and includes a program counter offset to the next NXB or BND instruction to allow skipping of instructions in a false branch.

BND — Defines the end of one or more branches and checks to determine if any of the branches are true. If not, it includes the program counter offset to the output instruction to enable skipping of unnecessary instructions.

STOB — Defines the start of output branches each containing an output instruction. It contains the program counter offset to the first output instruction to enable skipping of further test instructions when the rung or output branch tests false.

NXOB — Defines start of additional output branches and contains the program counter offset to the output instruction in the branch it defines.

2. Program Control Instructions

MCR — Defines a master control relay that is included as an output instruction in a rung. When set false, all rungs which follow are set false by STRT instructions, thus enabling the MCR to control entire blocks of output devices. Rungs which start with an STMC instruction are not affected by the state of the MCR.

LBL — Creates a table containing the absolute memory address of targets for JMP and JSR

TABLE A-continued
MACROINSTRUCTION SET

| | |
|---|---|
| | instructions. See U.S. Pat. No. 4,115,853. |
| JMP | A conditional jump to its corresponding LBL instruction. The jump is made if the rung in which it appears is true. |
| JSR | A call to a subroutine identified by the corresponding LBL instruction. The return program counter value is saved and the call occurs only if the rung containing the JSR instruction is true. |
| RET | Signals the end of a subroutine and returns to the instruction following the JSR instruction which called the subroutine. |
| ZCL | Defines the start and end of a block of instructions which are to be skipped when the rung containing the first ZCL instruction is false. |
| HALT | Unconditional emergency stop of the programmable controller processor with a fault indication. |
| END | Unconditional end of program which resets the watchdog timer and restarts the execution of the control program at its beginning. The END instruction also defines the set time of the watchdog timer enabling the user to control the maximum allowable scan time. |
| 3. Test Bit Instructions | |
| XIC | Test the status of a bit in the I/O image table. The rung condition remains true if the bit is on (1) and is set false if the bit is off (0). The instruction includes the address of the I/O image table word and a bit pointer which identifies the particular bit in that word. |
| XOE | |
| XIO | Same as XIC and XOE except rung condition is set false when the tested bit is on (1) and remains unchanged when the bit is off (0). |
| XOD | |
| 4. Control Bit Instructions | |
| OTE | If the rung condition is true and the master control relay (MCR) is inactive this instruction sets an indicated bit in the I/O image table on (1). Otherwise, the bit is set off (0). |
| OTL | Same as OTE except that the indicated bit is not set off (0), but is instead left unchanged. |
| OTU | If the rung condition is true and the master control relay (MCR) is inactive, this instruction resets a bit in the I/0 image table to off (0). Otherwise, no action occurs. |
| 5. Timer/Counter Instructions | |
| CTU | If the rung condition becomes true and the master control relay (MCR) is inactive, the indicated counter is incremented one count. |
| CTD | Same as CTU but the indicated counter is decremented one count. |
| RTO | This retentive timer instruction sets a "done bit" to on (1) at a preset time interval after the rung condition becomes true. If the rung condition becomes false during the time interval, timing stops but the accumulated time is retained. |
| RES | This instruction resets the accumulated count in an indicated counter or it resets the accumulated time in a retentive timer. |
| TON | This timer instruction sets a "done bit" to on (1) at a preset time interval after the rung condition becomes true. If the rung condition becomes false the done bit is reset to off (0) and the accumulated time is reset. |
| TOF | This timer instruction resets a "done bit" to off (0) at a preset time interval after the rung condition becomes false. If the rung condition becomes true, the done bit is set to on (1) and the accumulated time is reset. |
| 6. Arithmetic and Logical Instructions | |
| ADD | This instruction adds two source operands together and stores the sum in the indicated destination. The appropriate status register bits (result zero, carry, overflow and sign) are set. |
| SUB | This instruction subtracts the second source operand from the first source operand and stores the difference in the indicated destination. The appropriate status register bits are set. |
| MULT | This instruction multiplies the two source operands together and stores the product in the indicated destination. The appropriate status register bits are set. |
| DIV | This instruction divides the first source operand by the second source operand and stores the quotient at the indicated destination. The appropriate status register bits are set. |
| NEG | This instruction subtracts the first source operand from zero and stores the result in the indicated destination. The appropriate status register bits are set. |
| SQRT | This instruction takes the square root of the first source operand and stores the result at the indicated destination. The appropriate status register bits are set. |
| MOVE | This instruction moves the data at the first source operand to the indicated destination and sets the appropriate status register bits. Data is automatically converted when the source and destination are different data type sections of the data table 623. |
| CMP | This instruction subtracts the second source operand from the first source operand and sets the rung condition false if the comparison fails. The particular comparison to be made is indicated by the destination operand and includes:<br>Equal<br>Not Equal<br>Greater Than<br>Less Than<br>Greater Than Or Equal To<br>Less Than Or Equal To |
| LIMIT TEST | This instruction sets the rung condition false if the first source operand is not between the second source operand and the destination operand. |
| AND | This instruction performs a logical AND on each bit of the first source operand with the corresponding bits of the second source operand. The results are stored in the destination operand and the appropriate status register bits are set. |
| OR | Same as the AND instruction except a logical OR is performed on each bit. |
| XOR | Same as the AND instruction except an exclusive OR function is performed on each bit. |
| NOT | This instruction takes the complement of each bit in the first source operand and stores the result in the destination. The appropriate status register bits are set. |
| 7. Transparent Instructions | |
| SKIP | This instruction is employed to set off portions of the control program which contains nonexecutable data. Such data may be, for example, comments which are to be displayed on the terminal 8. |

Systems I/O Scanner Module

The system I/O scanner 4 is a single board microprocessor based module which directly interfaces the system backplane bus 1 with from one to four serial I/O buses which each connect to one or more I/O racks 16. The module 4 will also support communications with the front panel interface 11, and through a connector on the front panel interface 11, the system I/O scanner module 4 will also support the terminal 8. Indeed, although the system I/O scanner module 4 may be employed along with the other system modules as shown in FIG. 1, it is contemplated that the module 4 may also be configured as the sole means for performing I/O functions on small systems containing only a CPU module 3, a memory module 2 and a front panel interface 11.

The I/O scanner module 4 also serves as a communications link with a back-up programmable controller. Referring to FIG. 1A, two programmable controllers are shown connected to a common set of I/O racks 16. The elements of one programmable controller are identified with reference numbers followed by the letter "A" and like elements of the other programmable controller are identified with the letter "B". The I/O scanner modules 4A and 4B connect to one another through a pair of control lines 798 and 799 and a serial data link 412. In addition, each I/O scanner module 4A and 4B connects to the adapter circuits 17 on three I/O racks 16 through three serial data links 409-411. As will be described in more detail below, one of the two programmable controllers is active and the other is in a back-up mode of operation. Both programmable controllers monitor the status of all devices connected to the I/O racks 16 and the active controller operates all of the output devices connected to the I/O racks 16. If a malfunction occurs in the active controller, it is shut down and control is shifted to the back-up programmable controller.

Figure 7:
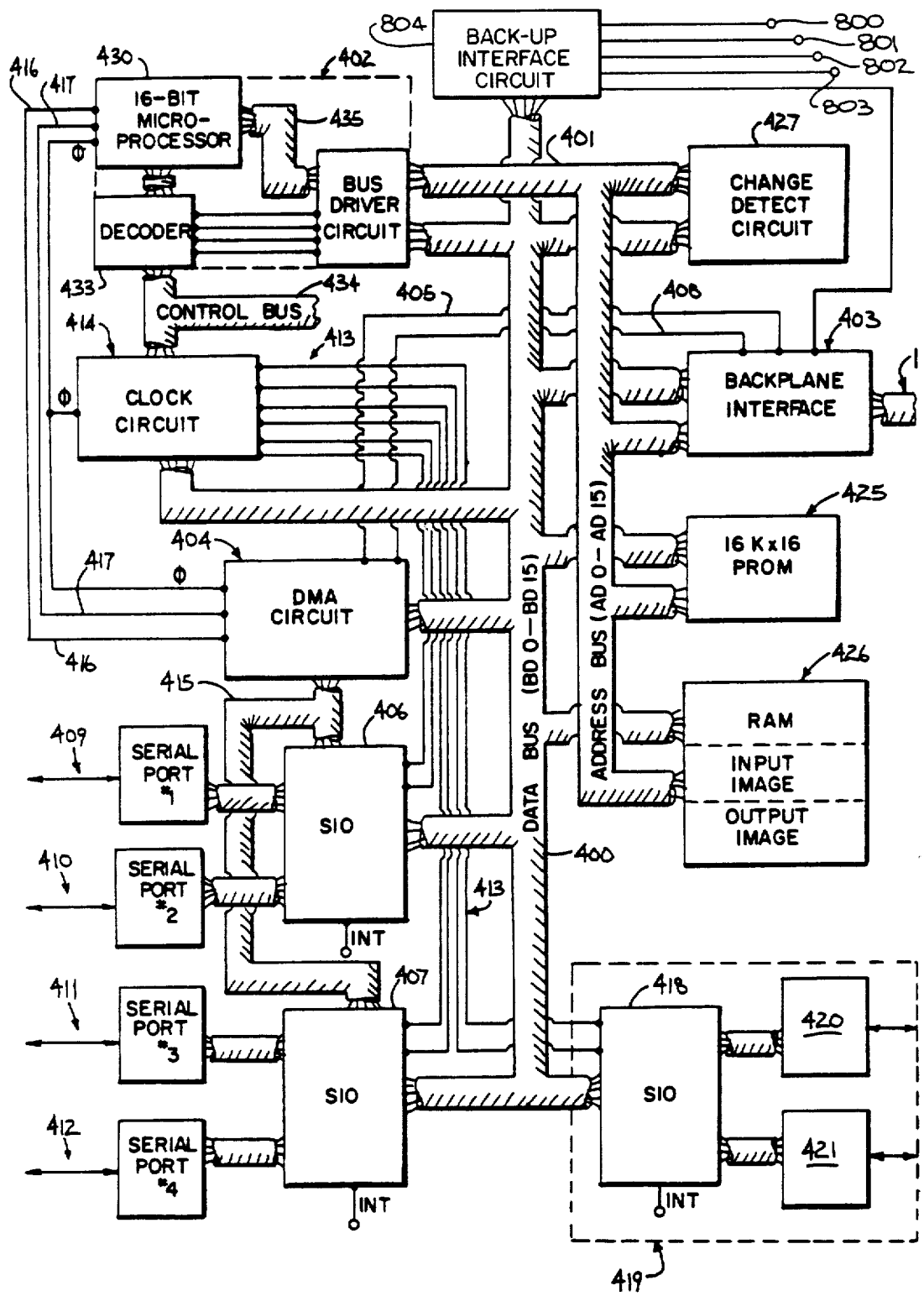
FIG. 7 is a block diagram of the I/O interface module which forms part of the system of FIG. 1.

Referring particularly to FIGS. 1 and 7, the system I/O scanner module 4 is structured about a sixteen-bit data bus 400 and a sixteen-bit address bus 401 which are controlled by a microprocessor circuit 402. The buses 400 and 401 are coupled to the system backplane bus 1 through a backplane interface circuit 403 and when data is to be transferred to or from the system backplane bus 1, the backplane interface circuit 403 makes a request to a DMA circuit 404 through a BPREQ control line 405. As will be explained in detail below, the DMA circuit 404 acknowledges the request through a BPACK control line 408 when the backplane interface circuit 403 can have access to the buses 400 and 401 to perform its data transfer.

A back-up interface circuit 804 connects to the data bus 400 and serves as a means for interfacing the I/O scanner module 4 to the control lines 798 and 799. As will be described in more detail below, the back-up interface circuit 804 provides the means for designating the programmable controller as the active or the back-up system, and the means for automatically reversing these designations when a problem occurs in the active system.

The DMA circuit 404 responds not only to requests from the backplane interface circuit 403, but also to similar requests received from two serial input/ouput circuits (SIOs) 406 and 407. The two SIOs 406 and 407 provide an interface to the three serial data links 409, 410 and 411 which connect to I/O racks 16, as well as the serial data link 412. The two channels in each SIO 406 and 407 are driven by clock lines 413 which connect to a clock circuit 414. When the SIOs 406 or 407 are ready to transmit a message or have received a message from a serial port 409-412, they generate a request signal to the DMA circuit 404 through a bus 415. The DMA circuit 404 generates a DMA request to the microprocessor 402 through a request line 416, and when the microprocessor 402 completes execution of its current instruction, it grants the DMA request through a line 417. The DMA circuit 404 then takes control of both the buses and the SIOs 406 and 407 to perform the message data transfer. When an end-of-message character is received by an SIO 406 or 407, it generates an interrupt request on control line INT to the microprocessor 402. As will be explained below, the microprocessor 402 responds to the interrupt by transferring the incoming message to the proper module in the system and by sending a message to one of the I/O racks 16.

Referring particularly to FIG. 7, a third SIO 418 also connects to the module data bus 400 and is driven through a pair of the clock lines 413. The SIO 418 forms part of an optional circuit 419 which interfaces the module 4 to the front panel 11 through a pair of serial ports 420 and 421. Both serial ports 420 and 421 connect to lines in the system backplane bus 1 which in turn connect to the ribbon connector leading to the front panel. Serial port 420 exchanges data at 4800 baud with the processor in the front panel circuit 11 and the serial port 421 exchanges data through an RS 232C connector which is mounted on the front panel. The SIO 418 is interrupt driven and when data is received, the microprocessor 402 is interrupted and vectored to the proper interrupt service routine.

The microprocessor 402 operates in response to instructions which are stored in a read-only memory (PROM) 425. These include interrupt service routines which are executed in response to interrupt requests on the INT control line, programs for executing tasks and communicating through the system backplane 1 with other modules in the system, and programs for configuring and driving the SIOs 406, 407 and 418.

The primary function of the system I/O scanner module 4 is to couple input/output data between the I/O image and data table 12 in the CPU module 3 and the I/O racks 16 which connect to the scanner module 4. The speed with which the scanner module 4 performs this function is an important factor in the operation of the programmable controller system and the preferred embodiment of the invention provides a unique structure to accomplish this. More specifically, a random access memory (RAM) 426 connects to the module buses 400 and 401, and in addition to providing work space for the microprocessor 402, it stores a copy of the output portion of the CPU module's I/O image table memory 12. The microprocessor 402 continuously updates the image table in the RAM 426 by reading output status data from the CPU module 3 and reading input status data from the I/O racks 16. The microprocessor 402 also continuously writes its output image table data to the I/O racks 16 and writes its input status data to the CPU module 3. This continuous updating, or "refreshing", of the I/O devices and associated I/O image tables is done at a relatively low priority and it is performed regardless of whether or not changes are occurring in the status of input/output devices.

Superimposed on this I/O refresh process is a high speed I/O update process which couples data indicative of changes in input/output status data. When data is written to the image table in the RAM 426 by the CPU module 3 (via the backplane interface 403) a change detect circuit 427 is enabled and stores an indication of which line in the RAM image table 426 was changed. The microprocessor 402 operates to repeatedly test the change detect circuit for such changes in I/O status data, and when a change is detected, to rapidly relay the detected change on to the I/O rack 16. In this manner, changes in status data are rapidly processed while the continuous I/O refresh process of all I/O points is carried on in the background.

Figure 8:
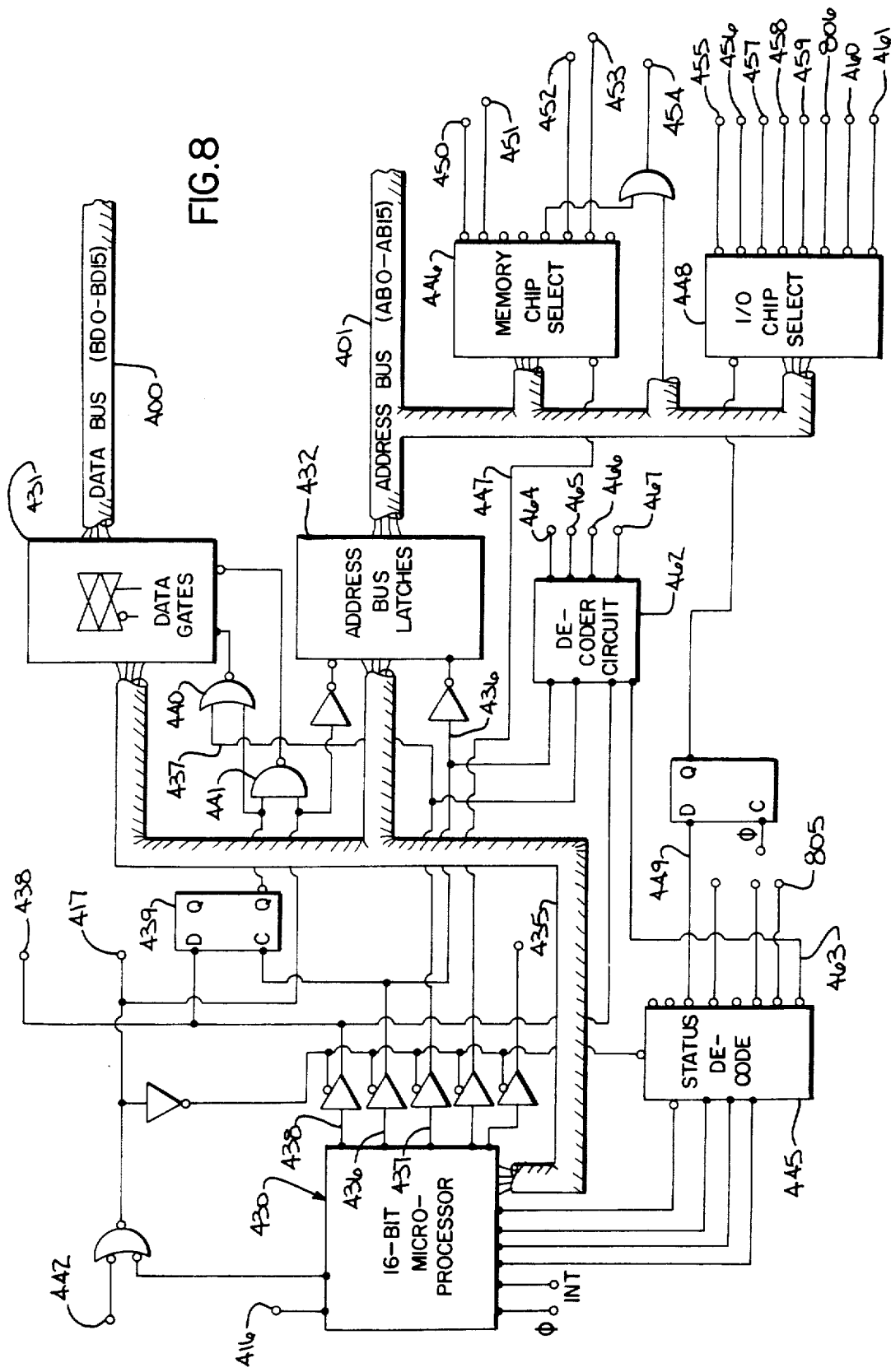
FIG. 8 is an electrical schematic diagram of the processor which forms part of FIG. 7.

Referring particularly to FIGS. 7 and 8, the microprocessor 402 is comprised of a 16-bit microprocessor 430 which couples to a bus driver circuit comprised of a 16-bit bidirectional data gates 431 and a 16-bit address bus latch 432. The microprocessor control lines connect to gates and decoder circuits which are collectively indicated in FIG. 12 as decoder 433 and which drive a number of module control lines indicated collectively in FIG. 7 as control bus 434.

Referring to FIG. 8, the 16-bit microprocessor 430 is commercially available as the model Z8002 and it drives a 16-lead data/address bus 435 which is coupled to both the data gates 431 and the address bus latches 432. The data gates 431 and the latches 432 are controlled by the microprocessor 430 through an address strobe line 436, a data strobe line 437 and a read/write line 438. During each read operation, the read/write line 438 sets a flip-flop 439 to activate a gate 440 and an address generated by the microprocessor 430 is then clocked into the latches 432 by the address strobe line 436. The data strobe line 437 is then driven low to both enable the address in the latches 432 to be applied to the address bus 401 and to enable the gate 431 to input data from the data bus 400. During a write operation the flip-flop 439 is reset to enable a gate 441 and an address is again clocked into latches 432. During the subsequent data strobe, data is coupled from the microprocessor 430, through the gates 431 to the data bus 400 and the address in the latches 432 is applied to the address bus 401. As will be described in more detail hereinafter, a bus disable line 442 may be driven low to disable this circuitry and thus effectively disconnect the microprocessor 430 from the buses 400 and 401 and the read/write line 438. For a detailed description of the 16-bit microprocessor 430 and its operation, reference is made to the "AMZ8000 Family Data Book" published in 1980 by Advanced Micro Devices, Inc.

Referring still to FIG. 8, the control signals for operating the various circuits in the scanner module 4 are derived from address data and control signals generated by the microprocessor 430. A three-to-eight status decode circuit 445 decodes the four status output signals from the microprocessor 430, a memory chip select circuit 446 is enabled by a MEM REQ control line 447, and an I/O chip select circuit 448 is enabled by an I/O REF output 449 from the status decode circuit 445. The chip select circuits are responsive to the address on bus 401 to enable the indicated circuits through control lines 450–461. The functions of these control lines 450–461 are indicated in the following table.

| Control Line | Function |
| --- | --- |
| 450 | Enable PROM 425 |
| 451 | Enable PROM 425 |
| 452 | Enable change detect circuit 427 |
| 453 | Request access to backplane from circuit 403 |
| 454 | Enable RAM 426 |
| 455 | Enable SIO 406 |
| 456 | Enable SIO 407 |
| 457 | Enable CTC 471 |
| 458 | Enable CTC 472 |
| 459 | Latch backplane address (hi portion) in circuit 403 |
| 460 | Enable DMA circuit 487 |
| 461 | Enable SIO 418 |
| 806 | Enable tristate gate 809 |

A decoder circuit 462 connects to the microprocessor control lines 436–438 and to a VIACK output 463 on the status decoder 445. The decoder circuit 462 operates to generate control signals similar to those generated by the 8-bit microprocessor sold commercially as the model Z-80, and reference is made to "A Small Z8000 System" published in 1980 by Zilog, Inc. for a more detailed description of its operation. It generates signals on a WR control line 464, an IORQ line 465, an M1 line 466 and a RD line 467 which are employed to operate many of the integrated circuits in the module 4.

Figure 9:
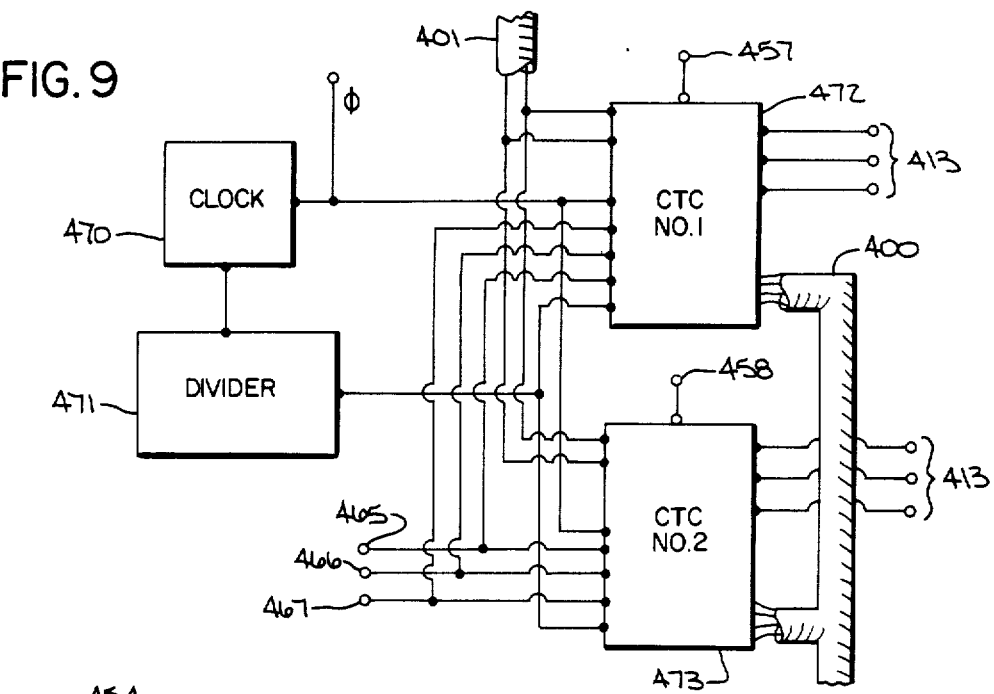
FIG. 9 is an electrical schematic diagram of the clock circuit which forms part of FIG. 7.

Referring particularly to FIGS. 7 and 9, the clock circuit 414 is comprised of a 4 megahertz clock 470, a divider 471 and a pair of counter timer circuits (CTCs) 472 and 473. The clock 470 generates the system clock 0 and it applies a clock signal to the divider 471 which reduces it in frequency to 1.8432 megahertz. The CTCs 472 and 473 receive these clock signals as well as control signals on lines 465–467 and address signals on leads AB3 and AB4. The CTCs 472 and 473 are initialized with data from the data bus 400 to generate clock signals of the desired frequencies on the lines 413 to each channel of the three SIOs 406, 407 and 418. This initialization is under program control and hence the baud rates of the six serial channels on the scanner module 4 may be easily changed to meet the specific requirements of the installation.

Figure 10:
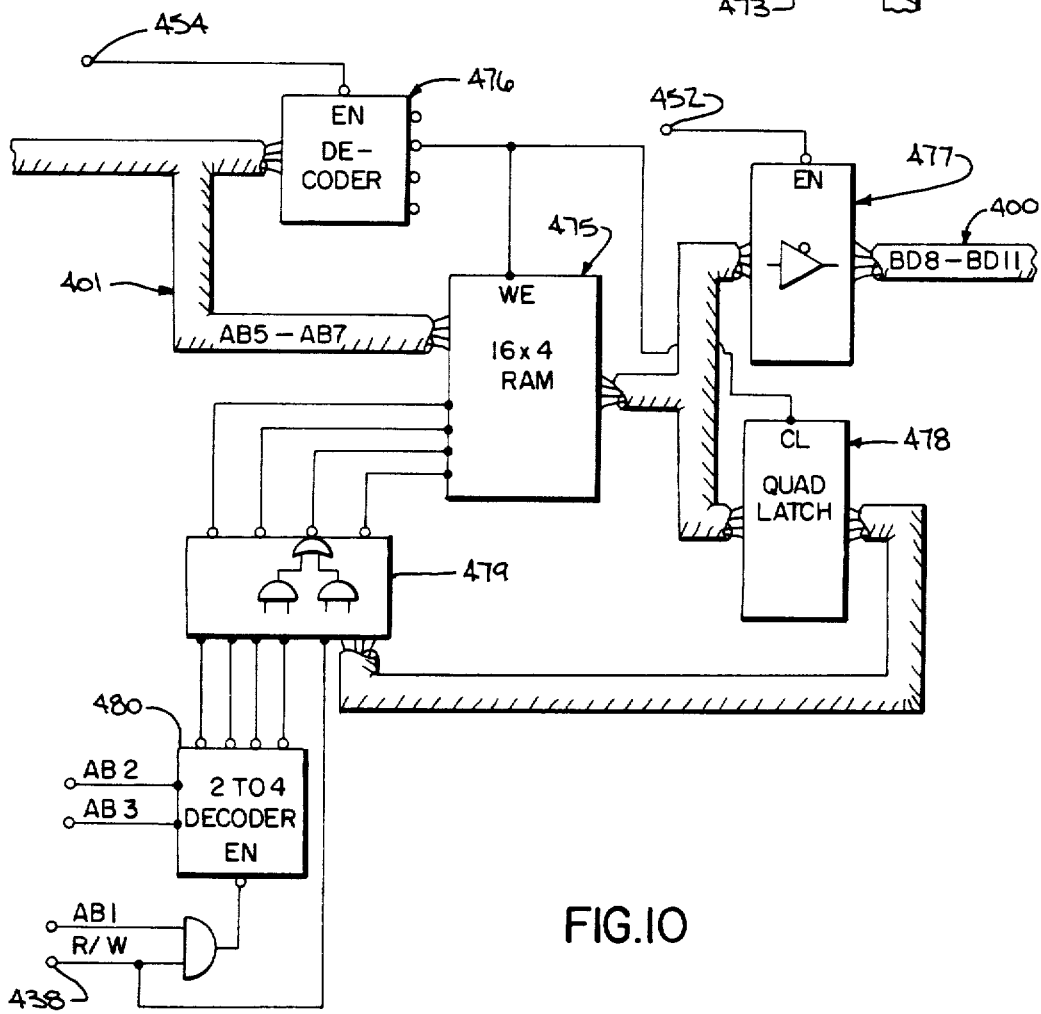
FIG. 10 is an electrical schematic diagram of the change detect circuit which forms part of FIG. 7.

Referring particularly to FIGS. 7 and 10, the change detect circuit 427 includes a sixty-four-bit random access memory (RAM) 475 which is arranged as sixteen 4-bit words. Its four address inputs connect to the address bus 401 and its write enable input (WE) connects to one output of a decoder 476. The RAM 475 is always enabled and it outputs data from one of its sixteen lines to a set of four output gates 477 and a quad latch 478. The output gates 477 are enabled by the control line 452, thus enabling the contents of any line in the RAM 475 to be read out to the data bus 400 under program control.

One task of the microprocessor 402 is to periodically read each line in the RAM 475 to determine if any bits have been set to a logic "1". Each bit in the RAM 475 corresponds to two lines in the image table in RAM 426, and when a logic "1" is detected, the microprocessor 402 promptly reads those image table lines and prepares a message to output them to the proper I/O rack 16. The I/O scanner module 4 thus monitors the change detect RAM 475 and quickly responds to any changes made in the output image table stored in the RAM 426.

Referring particularly to FIG. 10, the proper bits in the RAM 475 are set to a logic "1" when data is written to the image table in RAM 475. Such a write cycle enables the decoder 476 through RAM enable control line 454 and the decoder 476 clocks the quad latch 478 to latch the 4-bit output of the RAM 475. This same signal writes a new 4-bit word back into the same line of the RAM 475. The new 4-bit word is formed by the old 4-bit word, which is stored in the quad latch 478, and which is logically combined with signals applied to a gate circuit 479. A 2-to-4 decoder 480 connects to the inputs of gate circuit 479 and address bus leads AB2 and AB3 drive one of four of the decoder's outputs low to select one of the four bits in the old 4-bit word. The R/W control line 438 also connects to the gate circuit 479, and it operates to set the selected bit to a logic "1" during a RAM write operation and to reset the selected bit to a logic "0" during a RAM read operation. The new 4-bit word with the selected bit altered by logic gates 479 is thus written back into the RAM 475.

Figure 11:
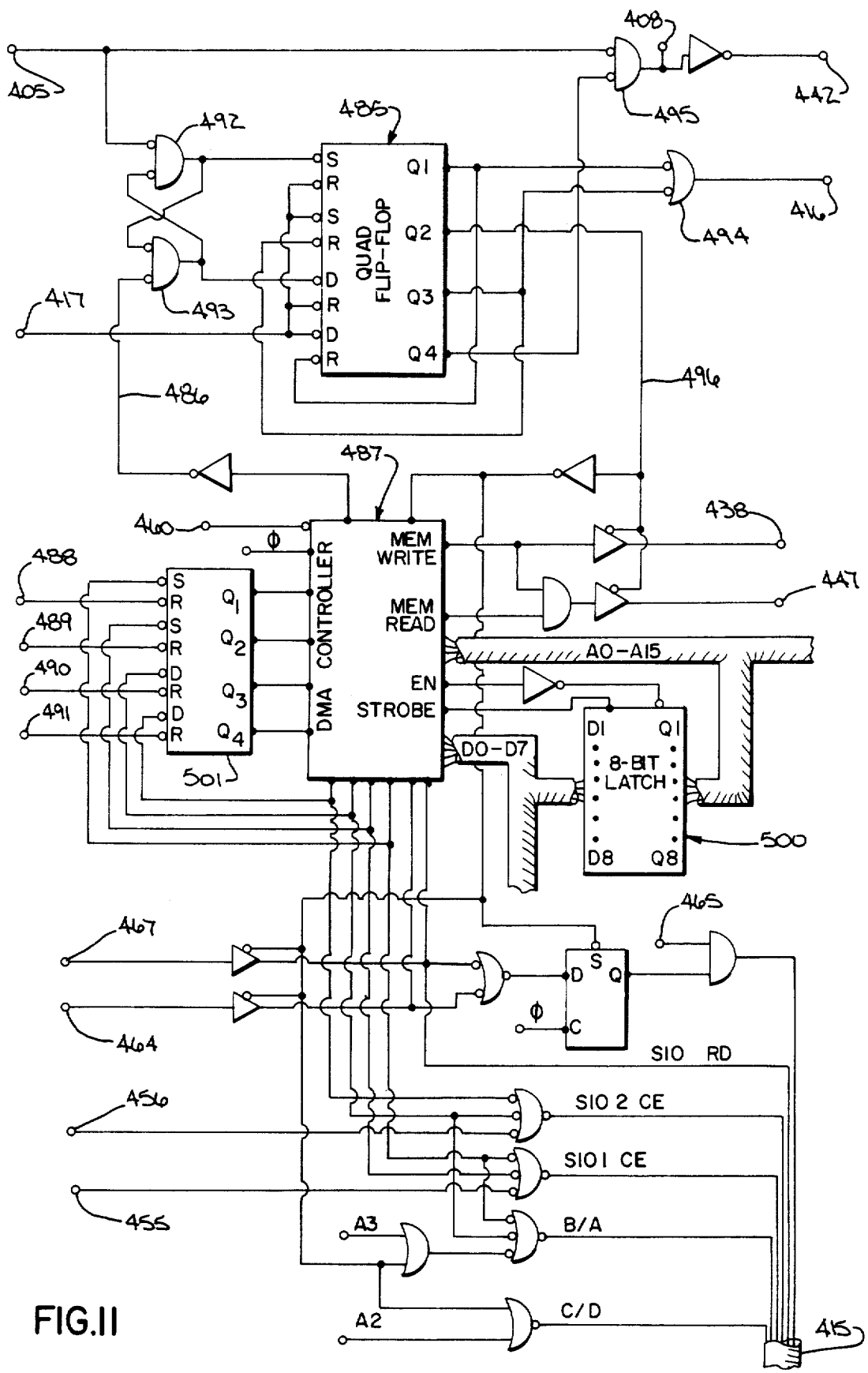
FIG. 11 is an electrical schematic diagram of the DMA circuit which forms part of FIG. 7.

Referring particularly to FIGS. 7 and 11, the DMA circuit 404 is structured about a quad flip-flop 485 which receives requests for the module buses through the backplane bus request control line 405 and a DMA request control line 486. The backplane bus request control line 405 is driven low by the backplane interface circuit 403 when another module in the programmable controller wants access to the I/O scanner module buses. The DMA request control line 486 is driven low by a DMA controller 487, which in turn is driven by the READY control lines 488–491 that emanate from the SIOs 406 and 407 and which connect to the DMA controller 487 through a set of flip-flops 501. The DMA controller 487 generates a logic low on the DMA request line 486 when either SIO 406 or 407 is ready to transfer a block of data to or from the module RAM 426.

A pair of AND gates 492 and 493 connect to the inputs of the quad flip-flop 485 and they are interconnected to allow only one of the two DMA request lines 405 or 486 to control at one time. If a DMA request originates from the backplane control line 405, the first flip-flop in the quad flip-flop 485 is set and its Q1 output is driven high. This is applied to an OR gate 494 which drives the bus request control line 416 low. This is applied to the 16-bit microprocessor 430 which responds by relinquishing control of the module buses and generating a logic low signal on the bus acknowledge control line 417. This sets the fourth flip-flop in the quad flip-flop 485 and its Q4 output generates a signal to the BPACK control line 408 through an AND gate 495 to initiate a transfer of data between the module 4 and the system backplane bus 1.

If a DMA request originates from one of the SIOs 406 or 407, the third flip-flop in the quad flip-flop 485 is set by the AND gate 493 and its Q3 output drives the bus request control line 416 through OR gate 494. When the 16-bit microprocessor 430 grants the request by driving control line 417 low, the second flip-flop in the quad flip-flop 485 is set and its Q2 output drives DMA ACK control line 496. The control line 496 signals the DMA controller 487 that the module buses have been relinquished and that it can proceed to perform a data transfer with the requesting SIO channel.

When the DMA controller 487 obtains control of the module buses it also takes the control lines 415 which operate the SIOs 406 and 407 and the RAM 426. The DMA controller 487 is a commercially available device which is described in a data sheet entitled "AM9517A Multimode DMA Controller Advanced Micro Devices Advanced MOS/LSI" published in 1979 by Advanced Micro Devices, Inc. It is "programmed" by the 16-bit microprocessor 430 during initialization to perform a data transfer between each of the four SIO channels and the RAM 426 when it obtains control of the buses. It loads the most significant byte of the data transfer starting address in an 8-bit latch 500 and it then generates this along with the least significant byte on the address bus 401. After each read and write operation, this address is incremented and an internal counter is decremented until the complete block of data is transferred between the requesting SIO channel and the RAM 426. In the preferred embodiment the four requesting SIO channels have rotated priority. At the completion of each message transfer the appropriate flip-flop 501 is reset and another requesting SIO channel may be serviced.

The system I/O scanner module 4 is thus structured to quickly relay any changes in output points dictated by the CPU module 3 on to the proper I/O rack 16 and to relay any changes in input points detected by the I/O racks 16 on to the CPU module 3. Secondarily, the I/O scanner module 4 may be employed to interface with the terminal 8 and the front panel 11 and it may be employed to initialize the memory module 2 during power-up. It is one aspect of the present invention that one of the serial I/O ports may also be employed for peer-to-peer communications.

Figure 20:
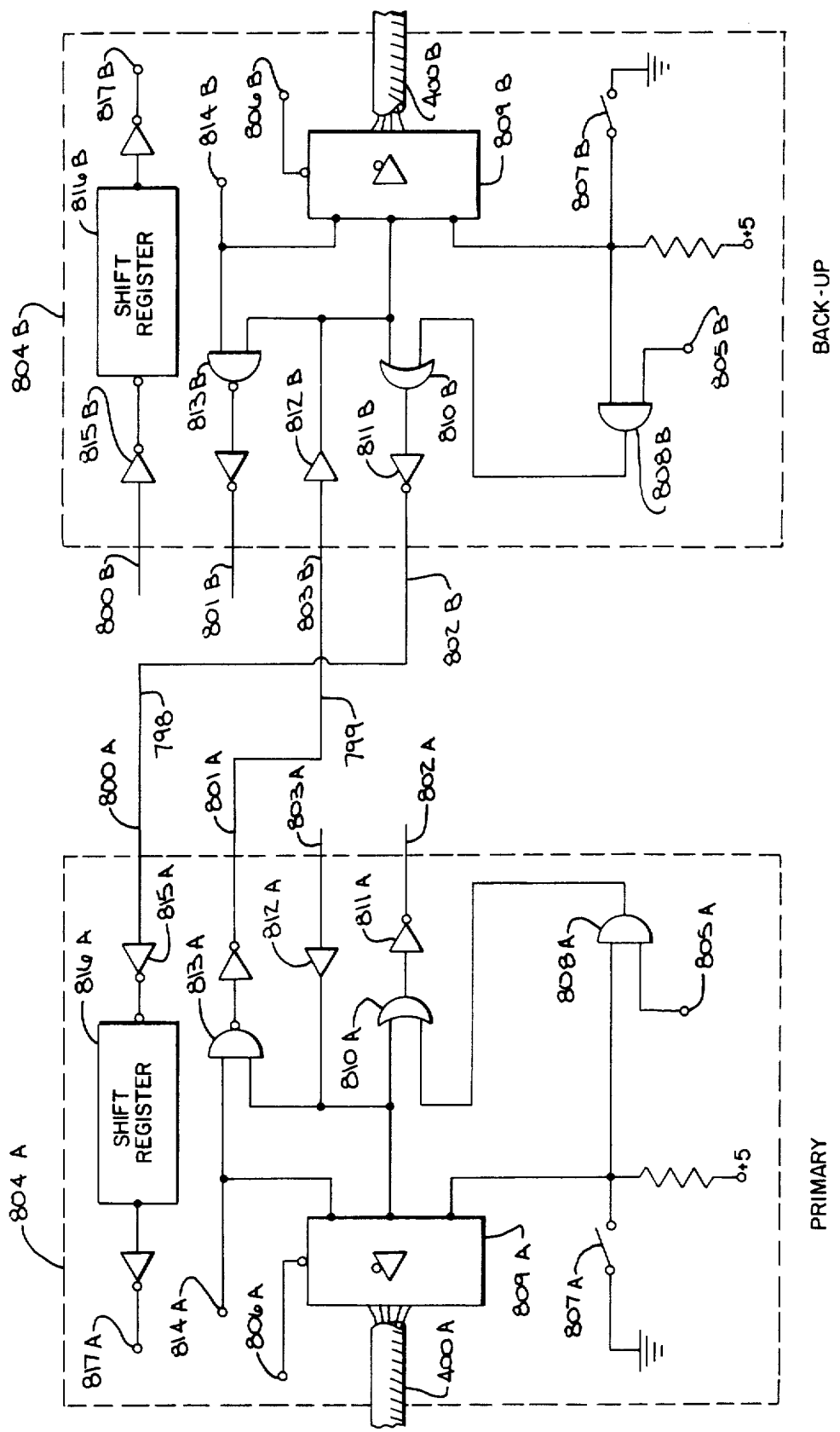
FIG. 20 is an electrical circuit diagram of the back-up interface circuit which forms part of the I/O scanner module of FIG. 7.

Referring particularly to FIGS. 1, 7 and 20, the back-up interface circuit 804 couples the I/O scanner module 4 to a similar module on a back-up programmable controller. The circuit 804 includes a switch 807 which may be set by the user to establish whether automatic switchover to the back-up system is enabled. When the switch 807 is open, the automatic switchover circuitry is enabled, and when closed, the automatic switchover circuitry is disabled.

Referring particularly to FIGS. 7 and 20, when a malfunction occurs in the active, or primary, programmable controller, the backplane fault line 814 rises to a logic high voltage. This is input to tristate gates 809 to alert the I/O scanner module 4 of the problem. Input to a NAND gate 813 drives control line 801 and indicates that control is to be switched to the back-up system. The back-up system receives this signal at gate 812B.

Referring particularly to FIG. 20, the status of the programmable controller, either active or back-up, is determined by the state of the input control line 803. On the primary programmable controller (indicated by the suffix "a" in FIG. 20) this input 803A is unconnected and floats to a logic high level which indicates the controller is active until a fault occurs. On the other hand, the input 803B on the back-up controller is connected to the output control line 801A and is held at a logic low level as long as the primary controller remains active. When a fault occurs in the primary controller, the input 803B on the back-up controller is driven high to indicate that the back-up controller is to switch to the active mode.

The switch in mode from back-up to active is accomplished through the tristate gates 809B. More specifically, the change in logic state on input 803B is coupled through a gate 812B and applied to one input of the tristate gates 809B and applied to one input of the tristate gates 809B. The state of this input is periodically checked by the scanner module 4, and when the active mode is indicated, the scanner module 4 writes the new status to the system status data portion 620 of the memory module 2 (FIG. 13A). Other modules in the back-up controller are programmed to periodically read this status data, and they are thus promptly notified that the back-up controller is to switch to the active mode.

After the switch in mode is accomplished in the back-up controller, the primary controller is notified. This is accomplished through the output control line 802B which drives the input control line 800A. The line 802B is driven by gates 811B and 810B, which is turn are driven by an AND gate 808B. When the back-up controller B becomes active, the microprocessor 430 in its scanner module 4 drives a control line 805B to a logic high voltage through the status decoder 445 (FIG. 8). This enables AND gate 808B and the primary controller is thus notified that the mode switch has occurred. This mode switch signal is received at a NAND gate 815A and is applied to a shift register 816A. Eight milliseconds later a backplane enable line 817 is driven to a logic low voltage and the I/O scanner module 4 on the primary controller is effectively disconnected from its backplane bus 1A.

It should be apparent from FIG. 20 that the back-up interface circuits 804A and 804B are identical and that their operation as either primary or back-up is determined by the manner in which they are interconnected. Although this results in some unused circuitry in any single application, it does allow either controller to be designated as either the primary or back-up controller by the user.

The back-up interface circuit 804 operates to establish which of two programmable controllers will actively operate the I/O racks 16. The back-up interface circuit 804 also operates to detect a malfunction condition in the active controller and to signal the back-up controller that it is to assume control of the I/O racks 16. Although control is thus automatically switched to the back-up system, the ability of the backup system to assume control is determined by its degree of readiness at the moment the switch occurs. As will be explained in more detail below, a primary function of the serial data link 412 is to couple status information to the back-up controller so that its data table 623 is up-to-date at all times.

Figure 18A:
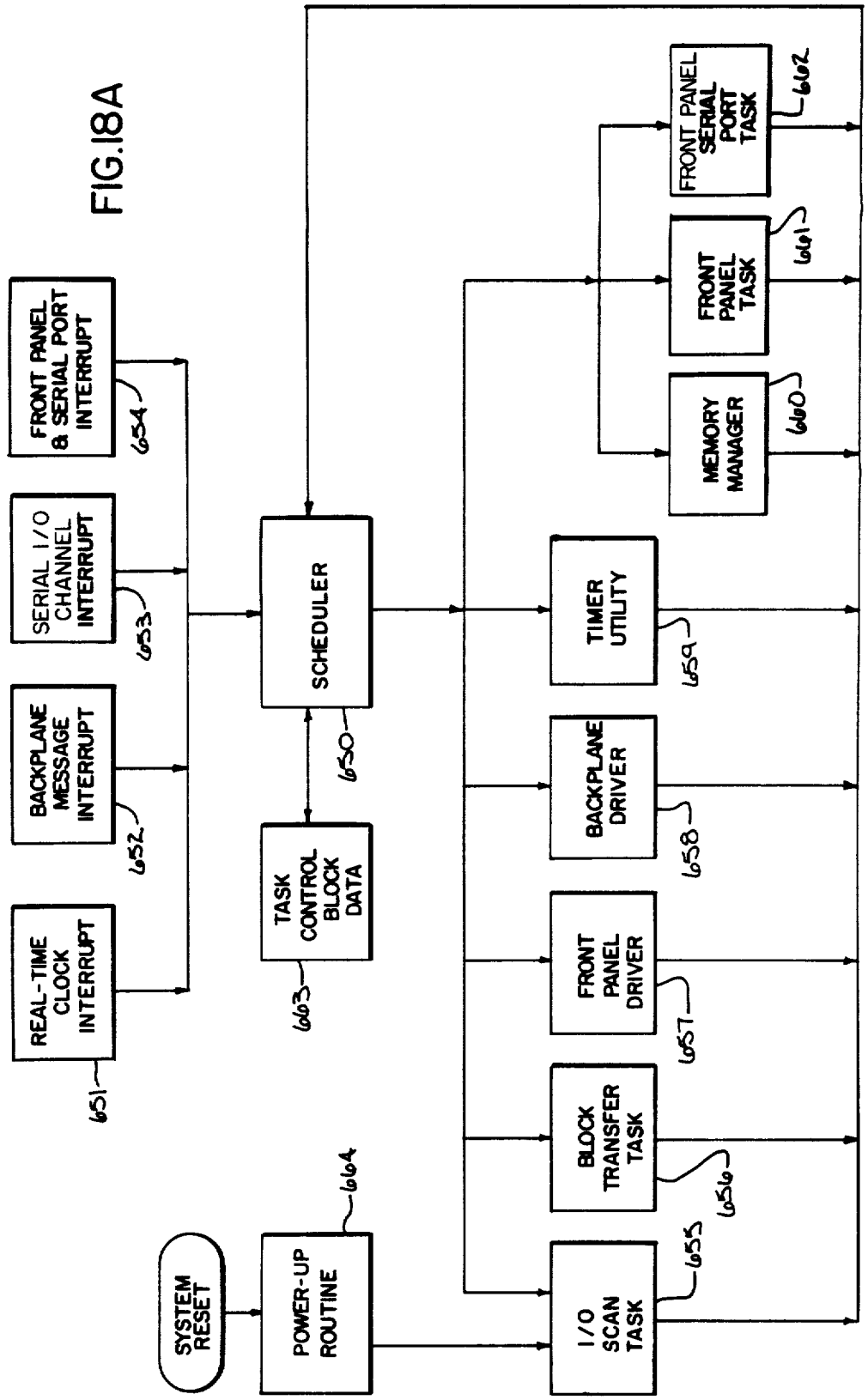

Referring particularly to FIGS. 1, 7, and 18A, the I/O scanner module 4 is responsible for initializing the programmable controller system during power-up, and for performing tasks associated with its six serial ports and its backplane interface. These functions are coordinated by a scheduler program 650 which is entered from any of four interrupt service routines 651–654 or from any of eight task programs 655–662. The scheduler 650 determines which of the tasks 655–662 should be executed by examining a linked list of task control blocks which are stored in the RAM 426 and indicated at 663. If more than one task is to be executed, the scheduler selects that task having the highest priority. That is, the scheduler examines the task control blocks 663 to determine if the I/O scan task 655 is to be executed, then it determines if the block transfer task 656 is to be executed, followed by the front panel serial driver 657, the backplane driver 658 and the timer utility 659. One of the three tasks 660, 661 or 662 is then given priority and the cycle repeats.

The task control blocks 663 store bits of data which indicate those tasks that are ready to be executed. These bits may be set by any of the tasks or by one of the interrupt service routines 651–654. For example, when the real time clock interrupts every one millisecond, the interrupt service routine 651 is executed to make an entry into the task control block 663 which indicates that the timer utility task 659 is to be executed. The scheduler 650 is then entered, and if no other tasks are ready to run, or if the timer utility 659 has priority, the task 659 will then be executed. An interrupt from the front panel 11 or the serial port on the front panel 11 is serviced by the routine 654 which sets a bit in the task control block 663 for either the front panel task 661 or serial port task 662. When these tasks 661 or 662 are then executed, they interpret commands and may in turn set a bit in the task control block for the front panel driver task 657 which transmits data back to the front panel 11.

The timer utility task 659 maintains counters which are incremental each time the real time clock interrupt occurs. In addition, this task 659 reads the mode data from the tristate gates 809 (FIG. 20) to determine if the controller is to be in the back-up or active mode. This data is then written to the system mode data register 608 in the memory module 2 (FIG. 13A) to promptly provide mode information to all modules in the programmable controller system. Thus, if a switch in operating mode is indicated by the back-up interface circuit 804 (FIG. 7), the entire programmable controller system is notified within a few milliseconds.

When an interrupt occurs as a result of data generated by one of the I/O racks 16, or the controller connected to the peer-to-peer communications link 412, the service routine 653 is executed. This I/O rack interrupt service routine 653 determines if the data received is intended for this I/O scanner module 4. If a block transfer of data from the I/O rack 16 has occurred, the block transfer task 656 is enabled; otherwise, the I/O scan task 655 is enabled. The block transfer function is described in more detail in co-pending U.S. patent application Ser. No. 242,132 which was filed on Mar. 9, 1981, and which is entitled "Programmable Controller for Executing Block Transfer With Remote I/O Interface Racks". The I/O scan task 655 will now be described in connection with a power-up routine 664.

Figure 18B:
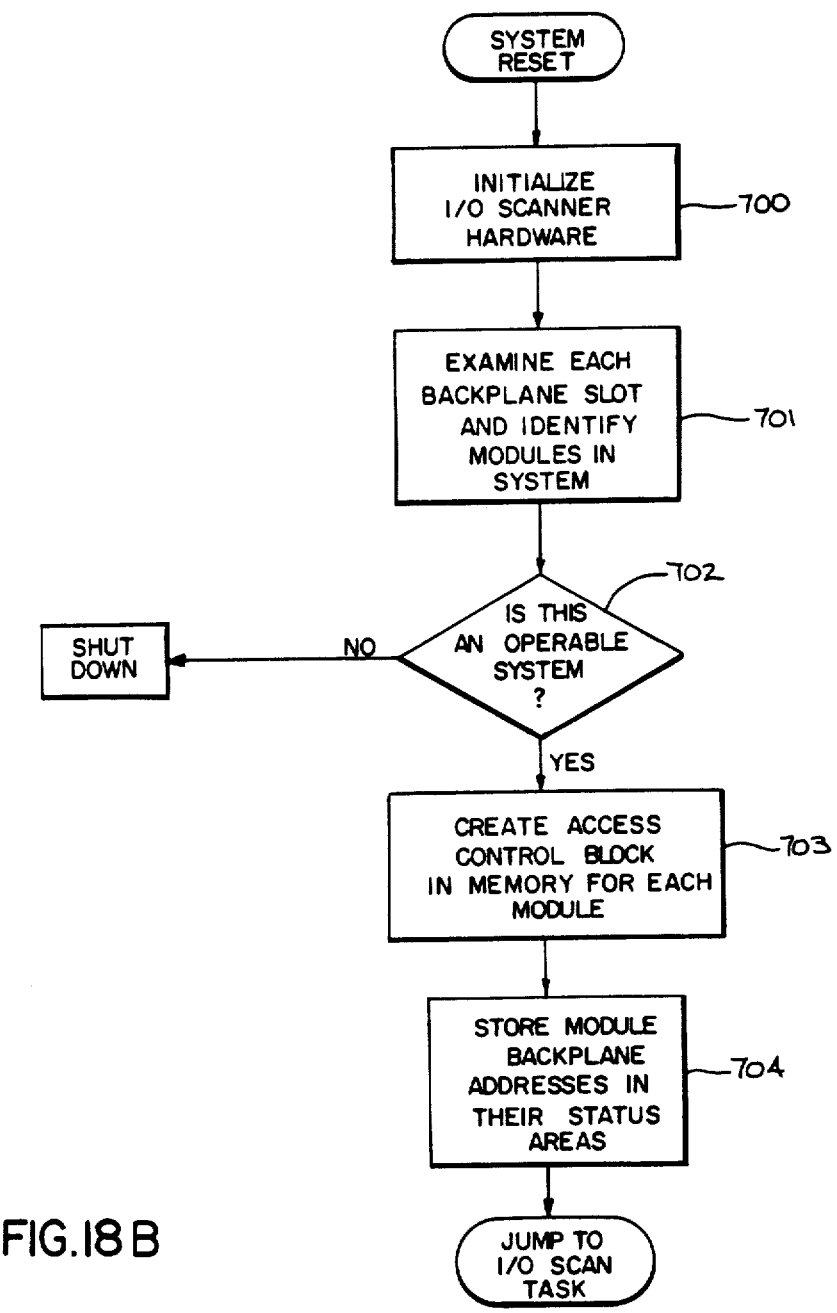

Referring particularly to FIGS. 1, 7 and 18B, the power-up routine in the I/O scanner module 4 is responsible for initializing the programmable controller system during power up. As indicated by process block 700, the first task, however, of the I/O scanner module processor 402 is to execute instructions which initialize the I/O scanner module 4 itself. This includes initialization of the SIOs 406, 407 and 419, the clock circuit 414, the change detect circuit 427 and the RAM 426. The processor 402 then executes instructions indicated by process block 701 to read from each backplane bus module slot to determine what modules are present in the system and which 256K address space they occupy. Instructions indicated by decision block 702 are then executed to determine if an operable programmable controller is configured. If not, the system shuts down.

The I/O scanner module 4 then initializes the sections 620–623 of the memory module 2. More specifically, it creates access control blocks 621 for each module connected to the backplane bus 1 as indicated by process block 703 and it sets up the module status areas 622 as indicated by process block 704. The I/O scanner module 4 also sets the system status counter 606 to the number of modules which require initialization and it sets the I/O prescan counter 610 to the number of I/O scanner modules present in the system. The power-up routine is then exited and the I/O scan task 655 is entered to complete system initialization.

Referring particularly to FIG. 18C, the I/O scan task 655 is entered initially from the power-up program 664. As indicated by process block 705, its first function is to perform an I/O prescan of the I/O racks 16 which are connected to the I/O scanner module 4. More specifically, the adaptors 17 on each I/O rack 16 are interrogated to determine the number and nature of each I/O circuit in the rack 16. Initialization messages are then created and stored in a message queue in the RAM 426 and the module 4 then checks to determine if it can begin the I/O prescan, as indicated by decision block 706.

The I/O scanner module 4 then enters a loop in which messages are output to all I/O racks 16. These initial messages turn all output devices off, and in response, messages are received from each I/O rack 16 which contain data concerning the state of all input devices. When this I/O prescan is complete as determined at decision block 720, the I/O scanner module 4 decrements the I/O prescan counter 610 in the memory module 2 to notify the CPU module 3 that initialization is complete.

Referring particularly to FIGS. 18A and 18C, each time the I/O scanner module 4 receives a message from an I/O rack 16, or the peer-to-peer communications link 412, an interrupt is generated and the I/O rack interrupt routine 653 is executed to queue up the I/O scan task 655. When the I/O scan task is subsequently entered, a check is made at decision block 707 to determine if the data was received through the serial link 412. If not, a check is made at decision block 711 to determine if input data was received. If it was, this data is written into a message queue for the backplane driver task 658 and that task is enabled to write the data to the I/O image table in the CPU module RAM 12 as indicated at process block 712. After the input data has been processed, a check is made at decision block 708 to determine if this controller is in the active or back-up mode. If it is the back-up controller, the system returns to the scheduler 650. Otherwise, the I/O scanner module 4 sends output messages to the I/O racks 16. As indicated by process block 716, the message queue for the I/O scan task is examined to determine the next I/O rack 16 to receive refresh output data from the I/O scanner module's output image table. In addition, the change detect RAM 475 is examined to determine if any outputs involving the same I/O rack 16 have been changed. This is accomplished by instructions indicated by decision block 717, and when "change" data is found, it is loaded into the output message queue as indicated by process block 718. As indicated by process block 719, the refresh data is loaded into the output message queue, and it, along with any change data, is sent to the proper I/O rack 16. A test is made at decision block 720 to determine if this is part of the I/O prescan process, and if not, the I/O scanner module 4 returns to the scheduler to perform other tasks.

Referring to FIGS. 18A and 18C, when a peer-to-peer communication is received through the serial data link 412, the input message is placed in the output queue for the backplane driver task 658 as indicated by process block 709. The backplane driver task 658 is also queued up and when it is subsequently executed, the peer-to-peer input message is transferred to the memory module 2 at the "destination data address" indicated in the scanner module status block 622 (FIG. 13C).

After the input message has been processed, a check is made at decision block 710 to determine if the controller is in the back-up mode. If it is, the system returns to the scheduler, otherwise, any output message for the serial data link 412 is formed and its transmission is initiated as indicated by process block 713. Such output messages are obtained from the memory module 2 at the "source data address" indicated in the scanner module status block 622. Reference is made to co-pending U.S. patent application Ser. No. 313,365 filed on Oct. 21, 1981 and entitled "Modular Programmable Controller" for a detailed description of the module-to-module communications technique.

The serial protocol used on the peer-to-peer communications data link 412 is bit oriented and is based on the SDLC protocol. The basic unit of information, or message, is shown in Table B.

TABLE B

| FLAG\|DESTINATION\|COMMAND\|SOURCE\| COUNT\|OFFSET\|DATA\|CRC\|FLAG | |
|---|---|
| FLAG | 8 bits which indicate the beginning and the end of a message. |
| DESTINATION | 8 bits which indicate the system number of the programmable controller which is to receive the message. |
| COMMAND | 8 bits which indicate the nature of the message, and in which bit 02 indicates whether the source controller is in the active or back-up mode. |
| SOURCE | 8 bits which indicate the system number of the programmable controller which originated the message. |
| COUNT | 8 bits which indicate the number of bytes of data in this message. |
| OFFSET | 16 bit offset from the beginning of a data file being transferred. This enables a large file to be transferred from one controller to another in smaller blocks. |
| DATA | From one to sixty-four bytes of data. |
| CRC | 16 bits employed to check for transmission errors. |

It should be apparent that the peer-to-peer communications capability may be employed not only in the context of providing information to a back-up controller, but also as a general purpose communications link with other programmable controllers. Indeed, in applications where programmable controllers need to communicate with one another, but the amount of traffic does not justify the added cost of a communications network interface module 7, the peer-to-peer communications link is an appropriate solution.

As indicated above, when the user initializes the two programmable controllers, one is designated the active controller and the other is designated the back-up controller. In addition, the source and destination addresses for peer-to-peer communications messages are designated in the memory modules 2. As a result, instructions in the user's control program can transfer data to the memory file indicated by the source address, and the I/O scanner module 4 will then automatically transmit this data through the serial data link 412 to the other programmable controller.

The I/O scanner module 4 on each controller automatically deposits message data received through the serial data link 412 in the memory file indicated by the destination address. The user's control program may read this received data and transfer it to another memory file. Using this peer-to-peer communications capability, important data structures, such as the data table, may be systematically transferred from the active to the back-up controller while the active controller is performing its normal control functions. If a malfunction should occur in the active controller therefore, the back-up controller has a relatively up-to-date copy of this important data structure.

In addition to this systematic transfer of data structures while the active controller is operating under normal conditions, the present invention also enables data structures to be transferred through the serial data link 412 after a malfunction has been detected. As indicated above, when a major fault occurs in the active programmable controller, a backplane fault line 814 goes to a logic high voltage and the back-up interface circuit 804 (FIG. 20) automatically operates to transfer control to the back-up programmable controller. When a major fault occurs, therefore, no further peer-to-peer communications takes place and the back-up controller must assume control with the data structures already on hand. Such major faults include a memory parity error and a "time out" of the CPU module watchdog timer.

There are numerous faults which may be detected by modules in the active programmable controller and which do not necessarily require that the active controller be shut down. Such "minor" fault indications are stored as a "minor fault flag" in the system status data portion 620 of the memory module 2 (FIG. 13A). Such minor faults may include battery low, battery high, thermal fault or single bit fault. The user may access the minor fault flags with his control program, and when such a fault is indicated, jump to a diagnostic program which is stored in the memory module 2. The diagnostic program may be written by the user to perform various tests on the controller modules and to output diagnostic messages through the front panel interface 11 or the program loader 8. Indeed, this diagnostic program may determine that the fault is not significant, or can be manually corrected, and that the active controller system is to continue operation.

On the other hand, the user's diagnostic program may employ the peer-to-peer communications feature of the present invention to transfer active control to the back-up controller. Typically this includes the transfer of all pertinent data structures to the back-up controller. When this data transfer is completed, the diagnostic program changes the system mode 608 in the memory module 2 (FIG. 13A) to "back-up". In addition, the backplane fault line 814 is driven high by the CPU module 3 to initiate the transfer of control to the back-up controller as described above.

The user's control program will also determine the manner in which the back-up controller operates. While in the back-up mode (as determined by periodically examining the system mode data 608) the controller executes a back-up portion of its control program which functions to process data that it receives from the active controller through the serial data link 412. This portion of the control program transfers data from the file designated as the destination of peer-to-peer communications to another file in the memory module 2. In this manner the controller's data table 623 and other data structures can be kept current. When the controller switches to the active mode, the user's control program may perform tests to determine if the controller has adequate current data to assume control, and if so, it jumps to execute the user's main control program.

| Reference No. | Description |
|---|---|
| Component Appendix - Central Processor | |
| 54, 89, 189 | Quadruple D-type flip-flops 74LS175 manufactured by Texas Instruments, Inc. |
| 33 | Microprogram Controller AM2910 manufactured by Advanced Micro Devices, Inc. |
| 42 | 2K × 4 PROM 82S185 manufactured by Signetics, Inc. |
| 31, 41 | 2K × 8 PROM 82S191 manufactured by Signetics, Inc. |
| 32, 47, 58, 116, 117, 130 131, 132, 139, 73 | Octal D-type transparent flip-flops 74LS374 manufactured by Texas Instruments, Inc. |
| 39 | Octal D-type flip-flop 74LS273 manufactured by Texas Instruments, Inc. |
| 46, 48, 80, 161, 112 | Octal buffers & line drivers 74LS244 manufactured by Texas Instruments, Inc. |
| 43 | Two 32 × 8 8 PROMS 82S123 manufactured by Signetics, Inc. |
| 26 | Four 4-bit bipolar microprocessor slices AM2903 manufactured by Advanced Micro Devices, Inc. |
| 51 | Data selector/Multiplexer 74LS151 manufactured by Texas Instruments, Inc. |
| 109, 113, 138 | Octal D-type transparent Latch 74LS373 manufactured by Texas Instruments, Inc. |
| 140, 63, 76 | Four synchronous 4-bit counters 74 LS163 manufactured by Texas Instruments, Inc. |
| 67 | Dual 4-bit binary counters 74LS393 and Dual 4-bit decode counters 74LS390 manufactured by Texas Instruments, Inc. |
| 83–88 | Dual D-type positive edge triggered flip-flops 74S74 manufactured by Texas Instruments, Inc. |
| 102 | 8-bit addressable latch 74LS259 manufactured by Texas Instruments, Inc. |
| 91 | 8-line-to-3-line priority encoder 74LS148 manufactured by Texas Instruments, Inc. |
| 105 | Two 32 × 8 PROMs 82S123 manufactured by Signetics, Inc. |
| 150 | Two 4-bit magnitude comparators 74S85 manufactured by Texas Instruments, Inc. |
| 184, 185 | Four-bit shift registers 74S194 manufactured by Texas Instruments, Inc. |
| 196 | Synchronous 4-bit counter 74LS163 manufactured by Texas Instruments, Inc. |
| Component Appendix - I/O Scanner | |
| 406, 407, 418 | Serial Input/Output (SIO) manufactured by Zilog, Inc. |
| 425 | Four 8KX8 UVPROMS TMS 2564 manufactured by Texas Instruments, Inc. |
| 426 | Sixteen 4KX1 static RAM 2141 manufactured by Intel, Inc. |
| 430 | 16-bit microprocessor AMZ8002 manufactured by Advanced Micro Devices, Inc. |
| 431 | Bidirectional data gates SN74LS243 manufactured by Texas Instruments, Inc. |
| 432 | Octal D-type Latches SN74LS373 manufactured by Texas Instruments, Inc. |
| 445, 446, 448 | Decoder/demultiplexer SN74LS138 manufactured by Texas Instruments, Inc. |
| 472, 473 | Counter Timer Circuit (CTC) manufactured by Zilog, Inc. |
| 477 | Three-state octal buffers SN74LS240 manufactured by Texas Instruments, Inc. |
| 478 | Four-bit bistable latch SN74LS75 manufactured by Texas Instruments, Inc. |
| 479 | AND-OR-INVERT gates 74LS51 manufactured by Texas Instruments, Inc. |
| 476, 480 | Decoder/demultiplexer SN74LS139 manufactured by Texas Instruments, Inc. |
| 487 | DMA Controller AM 9517A manufactured by Advanced Micro Devices, Inc. |
| 485, 501 | Quad latches SN74LS279 manufactured by Texas Instruments, Inc. |

-continued

| Reference No. | Description |
|---|---|
| 500 | Octal D-type Latch SN74LS373 manufactured by Texas Instruments, Inc. |
| 475 | 16X4 RAM 82S25 manufactured by Signetics, Inc. |

Appendix A

Microfield Definition

| Mnemonic | Control Lines & Device | Description |
|---|---|---|
| JUMP3 | microsequencer 33 | If register counter is not zero and condition is false, load PC from stack. When register counter is zero and condition is false, load PC from bus 44. If condition is true, increment PC. |
| CONT | microsequencer 33 | Increment PC. |
| LOOP | microsequencer 33 | If condition is true, increment PC. Otherwise put stack in PC. |
| LOAD | microsequencer 33 | Load register counter from bus 44. |
| RET | microsequencer 33 | Pop stack and load in PC. |
| AGAIN | microsequencer 33 | Loop until register counter is zero then load PC from bus 44. |
| BACK | microsequencer 33 | Same, but load PC from stack. |
| JUMP2 | microsequencer 33 | If condition true, load PC from bus 44. Otherwise, load PC from register counter. |
| VECT | microsequencer 33 | Input microaddress from bus 44. |
| CALL2 | microsequencer 33 | Same as JUMP2, but save PC on stack. |
| PUSH | microsequencer 33 | Load register counter from bus 44, push PC on stack. |
| JUMP | microsequencer 33 | Input microaddress from bus 44. |
| MAP | microsequencer 33 | Input microaddress from bus 44. |
| CALL | microsequencer 33 | Push address to stack, get target from bus 44. |
| RESET | microsequencer 33 | Force PC to zero, clear stack pointer. |
| PIPE | data selector 45 | Select data from bus 44. |
| ALV16 | data selector 45 | Select data from bus 44 and bus 40 and put on bus 44. |
| MACRO | data selector 45 | Select data from bus 44 and ALU port 30. |
| IVECT | Interrupt interface 52 | Enable microaddress on to bus 44. |
| ALU | Gates 56 | Couple microaddress from ALU 26 to bus 44. |
| MAP | MAP ROM 41 | Enable microaddress on to bus 44. |
| VECT | VECTOR ROM 42 | Enable microaddress on to bus 44. |
| INSTR | Gates 46 | Couple macroinstruction to ALU port 27 |
| DATA | Gates 48 | Couple data from bus 22 to ALU port 27. |
| RAM | Gates 48 | Couple data from bus 22 to ALU port 27. |
| BFLOP | | Swap high and low bytes in ALU registers. |
| TIME | control line 75 | Read real time clock latch 73. |
| TIME | control line 81 | Read scan counter gates 80. |
| FLAGS | | Read status of flags saved in register. |
| ADDR | address latch 47 | Store address data in latch 47. |
| BACKL | control line 135 | Store LSB of address in latch 131. |
| FETHI | control line 144 | Store MSB of address in latch 139. |
| BACKH | control line 136 | Store MSB of address in latch 132. |
| FETCH | control line 141 | Load address in macro counter 140. |
| DATA | data latch 58 | Store data in latch 58. |
| BACKD | control line 133 | Store data in latch 130. |
| IRES | control line 108 | Enable decoder 107 to reset interrupt. |
| SYST | status latch 36 | Control backplane lines, including backplane fault line 814. |
| TIME | control line 77 | Store time in scan counter 76. |
| IMASK | control line 103 | Enable addressable latch 102. |
| ILOAD | control line 123 | Load prefetched macro in register 39 |
| IMM | Gates 57 | Couple macroinstruction data to ALU port 28. |
| MASK | Bit Pointer ROM 43 | Generate bit pointer mask to ALU port 28. |
| NMASK | Bit Pointer ROM 43 | Generate inverted bit pointer mask. |
| HOLD | control line 185 | Activate backplane HOLD line 175. |
| BWH | control lines 185 and 187 | Activate backplane write line and hold it. |
| BRH | control lines 185 and 186 | Activate backplane read line and hold it. |
| WRITE | control line 164 | Write data on CPU bus 22. |
| READ | control line 166 | Read data on CPU bus 22. |
| BACKW | control line 187 | Write data on backplane bus 1. |
| BACKR | control line 186 | Read data on backplane bus 1. |
| ZER | | Set carry to zero. |
| ONE | | Set carry to one. |
| ZFL | | Set carry to ALU zero flag state. |
| CAR | | Set carry to carryout of previous ALU operation. |
| TRUE | STATUS MUX 51 | Was the result true? |
| FALSE | STATUS MUX 51 | Was the result false? |
| INTER | STATUS MUX 51 | Is an interrupt request present? |
| PARITY | STATUS MUX 51 | Is a parity error indicated? |
| CARRY | STATUS MUX 51 | Was there a carry? |
| NCARR | STATUS MUX 51 | Was there no carry? |
| OVER | STATUS MUX 51 | Was there an overflow? |
| MOVER | STATUS MUX 51 | Was there no overflow? |
| MINUS | STATUS MUX 51 | Was the result minus? |
| PLUS | STATUS MUX 51 | Was the result not minus? |
| ZERO | STATUS MUX 51 | Was the result zero? |
| NZERO | STATUS MUX 51 | Was the result not zero? |

We claim:

1. In a programmable controller having a memory which stores a control program and a data table, and having a processor for executing the control program to input status data from I/O circuits which connect to a machine being controlled and for outputting data to the I/O circuits for operating devices on the machine being controlled, the improvement comprising:

mode indicating means for indicating that the programmable controller is either in an active or a back-up mode of operation;

means coupled to the mode indicating means and being operable when the programmable controller is in the back-up mode for inhibiting the output of data to the I/O circuits;

means for coupling the programmable controller to another similar programmable controller which is connected to the same I/O circuits and being operable when a switch signal is received from the said another similar programmable controller for operating said mode indicating means to indicate that the programmable controller is in the active mode;

whereby the programmable controller may be operated initially as a back-up controller in which it only inputs status data from the I/O circuits on the machine being controlled, and when the switch signal is received from said another similar programmable controller, the programmable controller changes to the active mode in which it continues to input status data from the I/O circuits and it outputs data to the I/O circuits.

2. The programmable controller as recited in claim 1 in which a data link couples the programmable controller to said another similar programmable controller and the programmable controller includes means for transferring data from a data table in said another similar programmable controller through the data link to the data table in said programmable controller memory, whereby status data is transferred to the programmable controller while it is in the back-up mode, which status data enables the programmable controller to assume control of the machine being controlled when it is switched to the active mode.

3. The programmable controller as recited in claim 1 which includes fault means that connects to elements of the programmable controller and which couples to the mode indicating means for switching the programmable controller from its active mode to its back-up mode when a malfunction is detected in one of said programmable controller elements.

4. The programmable controller as recited in claim 3 in which said mode indicating means includes means for generating a signal to said another similar programmable controller when a malfunction is detected by the fault means.

5. In a programmable controller having a memory which stores a control program, an I/O image table and a data table, and having a processor for executing the control program to examine the state of the data table and the I/O image table and to alter the state of the I/O image table, the improvement therein comprising:

means for indicating the programmable controller is in either an active or a back-up mode; and scanner means coupled to the memory and including:
  (a) an I/O port for coupling the scanner means to an I/O rack containing circuits which connect to sensing devices and operating devices on the machine being controlled by the programmable controller;
  (b) means for reading data from the I/O image table in the memory and outputting the data through the I/O port to the I/O rack;
  (c) means for inputting status data from the I/O rack through the I/O port and writing the data into the I/O image table;
  (d) a peer-to-peer communications port for coupling data with another similar programmable controller;
  (e) means for designating a source portion of the data table in the memory;
  (f) means for designating a destination portion of the data table in the memory;
  (g) means for reading data from the source portion of the data table and outputting it through the peer-to-peer communications port to said another similar programmable controller;
  (h) means responsive to the receipt of data at the peer-to-peer communications port for writing the received data into the destination portion of the data table; and
  (i) means coupled to the mode indicating means for inhibiting the outputting of I/O image table data to the I/O rack when the programmable controller is in the back-up mode.

6. The programmable controller as recited in claim 5 in which the scanner means further includes:
  (j) means coupled to the mode indicating means and being responsive to the receipt of a switch signal for changing the mode of operation of the programmable controller.

* * * * *